(12) United States Patent
Fox et al.

(10) Patent No.: US 10,807,283 B2
(45) Date of Patent: Oct. 20, 2020

(54) VEHICLE TRIM COMPONENT

(71) Applicant: Shanghai Yanfeng Jinqiao Automotive Trim Systems Co. Ltd., Novi, MI (US)

(72) Inventors: Bart W. Fox, Zeeland, MI (US); Jeffrey A. DeYoung, Holland, MI (US); Tony M. Pokorzynski, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 0 days.

(21) Appl. No.: 16/654,620

(22) Filed: Oct. 16, 2019

(65) Prior Publication Data

US 2020/0055215 A1    Feb. 20, 2020

Related U.S. Application Data

(60) Continuation of application No. 15/995,621, filed on Jun. 1, 2018, now Pat. No. 10,507,609, which is a
(Continued)

(51) Int. Cl.
| | |
|---|---|
| *B29C 45/00* | (2006.01) |
| *B29C 43/02* | (2006.01) |
| *B29C 43/36* | (2006.01) |
| *B29C 43/40* | (2006.01) |
| *B29C 45/14* | (2006.01) |
| *B32B 3/26* | (2006.01) |
| *B32B 7/04* | (2019.01) |
| *B29L 31/30* | (2006.01) |
| *B29K 105/08* | (2006.01) |
| *B29C 43/14* | (2006.01) |

(Continued)

(52) U.S. Cl.
CPC .......... *B29C 45/0005* (2013.01); *B29C 43/02* (2013.01); *B29C 43/361* (2013.01); *B29C 43/40* (2013.01); *B29C 45/14786* (2013.01); *B32B 3/266* (2013.01); *B32B 7/04* (2013.01); *B29C 43/146* (2013.01); *B29C 43/183* (2013.01); *B29C 45/1418* (2013.01); *B29C 45/14336* (2013.01); *B29C 2043/325* (2013.01); *B29C 2043/3663* (2013.01); *B29C 2043/3665* (2013.01); *B29C 2045/14901* (2013.01); *B29C 2045/14909* (2013.01); *B29K 2105/08* (2013.01); *B29L 2031/302* (2013.01); *B29L 2031/3014* (2013.01); *B29L 2031/3041* (2013.01); *Y10T 428/192* (2015.01); *Y10T 428/2481* (2015.01); *Y10T 428/24273* (2015.01); *Y10T 428/24331* (2015.01); *Y10T 428/24339* (2015.01)

(58) Field of Classification Search
CPC ................................................. B29C 45/0005
See application file for complete search history.

*Primary Examiner* — Larry W Thrower

(57) ABSTRACT

A trim component for a vehicle interior is disclosed. The trim component may comprise a fiber panel comprising a compression-formed component and a structure comprising a resin. The compression-formed component may provide a structural substrate. The structure may comprise a border (e.g. edge, dimensionally accurate border, etc.); the structure may comprise a molded feature (e.g. rib, ridge, edge, ancillary component, etc.) configured to reinforce and/or support the fiber panel. The fiber panel may comprise a resin to bond the fibers; the structure comprising a resin (e.g. injection-molded plastic/material) may be bonded to the fiber panel. The trim component may comprise a cover for the structural substrate provided by the compression-formed component.

20 Claims, 10 Drawing Sheets

Related U.S. Application Data continuation of application No. 14/808,938, filed on Jul. 24, 2015, now Pat. No. 10,118,325, which is a division of application No. 13/846,529, filed on Mar. 18, 2013, now Pat. No. 9,149,961, which is a continuation of application No. 13/595,741, filed on Aug. 27, 2012, now Pat. No. 8,939,745.

(60) Provisional application No. 61/528,832, filed on Aug. 30, 2011.

(51) Int. Cl.
*B29C 43/18* (2006.01)
*B29C 43/32* (2006.01)

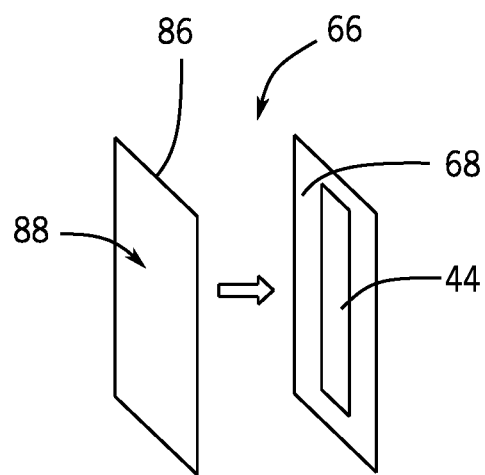
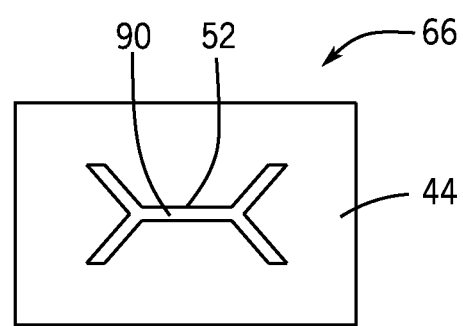
FIG. 6      FIG. 7
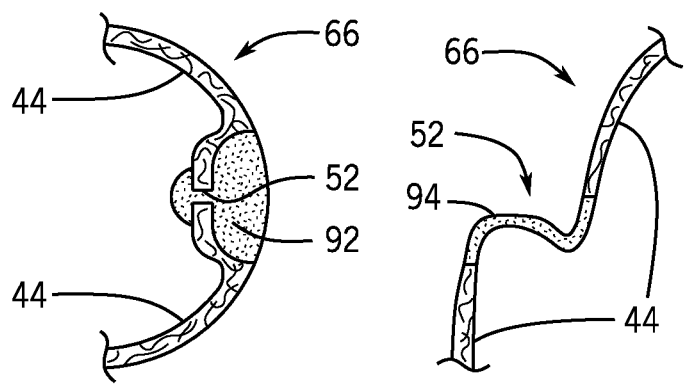
FIG. 8      FIG. 9      FIG. 10

VEHICLE TRIM COMPONENT

CROSS-REFERENCE TO RELATED APPLICATIONS

The present application is a continuation of U.S. patent application Ser. No. 15/995,621 titled "VEHICLE TRIM COMPONENT" filed Jun. 1, 2018, which is a continuation of U.S. patent application Ser. No. 14/808,938 titled "VEHICLE TRIM COMPONENT" filed Jul. 24, 2015 (now U.S. Pat. No. 10,118,325), which is a division of U.S. patent application Ser. No. 13/846,529 titled "SYSTEM AND METHOD FOR MANUFACTURING A VEHICLE TRIM COMPONENT VIA CONCURRENT COMPRESSION FORMING AND INJECTION MOLDING" filed Mar. 18, 2013 (now U.S. Pat. No. 9,149,961), which is a continuation of U.S. patent application Ser. No. 13/595,741 titled "SYSTEM AND METHOD FOR MANUFACTURING A VEHICLE TRIM COMPONENT VIA CONCURRENT COMPRESSION FORMING AND INJECTION MOLDING" filed Aug. 27, 2012 (now U.S. Pat. No. 8,939,745), which claims the benefit of U.S. Provisional Patent Application No. 61/528,832 titled "SYSTEM AND METHOD FOR MANUFACTURING A VEHICLE TRIM COMPONENT VIA CONCURRENT COMPRESSION FORMING AND INJECTION MOLDING" filed Aug. 30, 2011.

The present application claims priority to and incorporates by reference in full the following application(s): (a) U.S. Provisional Patent Application No. 61/528,832 titled "SYSTEM AND METHOD FOR MANUFACTURING A VEHICLE TRIM COMPONENT VIA CONCURRENT COMPRESSION FORMING AND INJECTION MOLDING" filed Aug. 30, 2011; (b) U.S. patent application Ser. No. 13/595,741 titled "SYSTEM AND METHOD FOR MANUFACTURING A VEHICLE TRIM COMPONENT VIA CONCURRENT COMPRESSION FORMING AND INJECTION MOLDING" filed Aug. 27, 2012 (now U.S. Pat. No. 8,939,745); (c) U.S. patent application Ser. No. 13/846,529 titled "SYSTEM AND METHOD FOR MANUFACTURING A VEHICLE TRIM COMPONENT VIA CONCURRENT COMPRESSION FORMING AND INJECTION MOLDING" filed Mar. 18, 2013 (now U.S. Pat. No. 9,149,961); (d) U.S. patent application Ser. No. 14/808,938 titled "VEHICLE TRIM COMPONENT" filed Jul. 24, 2015 (now U.S. Pat. No. 10,118,325); (e) U.S. patent application Ser. No. 15/995,621 titled "VEHICLE TRIM COMPONENT" filed Jun. 1, 2018.

FIELD

The present invention relates to a vehicle interior component.

The present invention also relates to a system and method for manufacturing a vehicle trim component via concurrent compression forming and injection molding.

BACKGROUND

Certain vehicle trim components are produced by compression forming a fiber panel into a desired shape. For example, certain fiber panels include a combination of structural fibers (e.g., natural and/or synthetic fibers) and thermoplastic resin (e.g., polypropylene (PP), acrylonitrile butadiene styrene (ABS), polycarbonate (PC), etc.). To form a trim component from such a fiber panel, the panel is heated to induce the thermoplastic resin to liquefy. The fiber panel is then placed into a low-temperature mold and compression molded into a desired shape. As the fiber panel cools, the thermoplastic solidifies, establishing a substantially rigid composite panel. Alternative fiber panels include a combination of structural fibers and a thermoset resin (e.g., epoxy, polyester, etc.). To form a trim component from such a fiber panel, the panel is compressed within a heated mold to form the panel into the desired shape, and to induce curing of the resin. Once the thermoset resin cures, a substantially rigid composite panel is formed.

Once the molding process is complete, the composite panel is removed from the mold, and the edges are trimmed to the desired dimensions. The composite panel is then placed within a second mold to form ancillary components, such as support ribs and/or connectors. For example, the second mold may include a primary cavity configured to receive the trim component and secondary cavities corresponding to the shape of each ancillary component. Liquid resin may be injected into each of the additional cavities to form the desired ancillary components. As the resin hardens, the ancillary components may bond to the surface of the composite panel, forming a completed trim component. Components may be attached to the panel with adhesives and/or mechanical connectors, or rigid components may be pressed into the fiber panel during the compression forming process.

The process of trimming the composite panel to establish the dimensionally accurate edges is time consuming, and generates a significant amount of offal (i.e., excess material). Trimming leaves jagged edges that may weaken the composite panel, reducing service life. Transferring the trim component from the first mold to the second mold increases the duration of the manufacturing process. The design and manufacturing costs associated with producing two separate molds increases the setup expenses for the trim component manufacturing process.

SUMMARY

The present invention relates to a trim component for a vehicle interior comprising a fiber panel and a structure comprising a resin. The fiber panel may comprise a compression-formed component. The compression-formed component may comprise an edge along a periphery and may provide a structural substrate having a shape and a thickness along the edge. The structure may comprise a border of the structural substrate along the thickness of the structural substrate provided by the compression-formed component. The fiber panel may comprise a plurality of fibers and a resin configured to bind the fibers; the structure may comprise a molded resin. The periphery of the compression-formed component may comprise an edge; the structure may be formed on the edge. The structure may be configured to accommodate at least one variation in at least one edge of the fiber panel. The structure may comprise a rib configured to reinforce the fiber panel. The structure may comprise a molded feature configured to support the fiber panel. The trim component may further comprise a cover for the structural substrate. The cover may comprise at least one of (a) cover stock; (b) a woven fabric; (c) a non-woven fabric; (d) an applique; (e) a vinyl layer; (f) a foam layer; (g) a foil layer; (h) a leather covering.

The present invention relates to a trim component for a vehicle interior comprising a fiber panel comprising a compression-formed component and a structure formed from a molded resin. The structure may comprise at least one molded feature. The compression-formed component may comprise an edge along a periphery and may provide a structural substrate having a shape and a thickness along the edge. The structure may comprise a border of the structural substrate along the thickness of the structural substrate provided by the compression-formed component. The at least one molded feature may comprise a molded feature configured to support the fiber panel. The molded feature configured to support the fiber panel may comprise a rib. The rib may comprise at least one of (a) a ridge; (b) a runner. The molded feature may comprise the border coupled to at least a portion of a periphery of the fiber panel. The border of the structural substrate may comprise a resin border about a periphery of the fiber panel. The trim component may further comprise a cover for the compression-formed component.

The present invention relates to a trim component for a vehicle interior comprising a structural substrate comprising a compression-formed fiber panel and a structure comprising a resin. The compression-formed fiber panel may comprise a thickness along a periphery. The structure may comprise a border of the structural substrate along the thickness of the periphery of the compression-formed fiber panel. The periphery of the fiber panel may comprise an edge; the structure may be formed on the edge. The fiber panel may comprise a plurality of fibers and a resin configured to bind the fibers; the structure may comprise a molded resin. The structure may be bonded to the compression-formed fiber panel. The structure may comprise an injection-molded resin configured to reinforce the compression-formed fiber panel. The structure may comprise a molded feature providing an ancillary component. The border may comprise a dimensionally accurate border.

The present invention relates to a vehicle trim component comprising a fiber panel compression formed in a mold cavity. The vehicle trim component may be prepared by a process comprising the steps of heating the fiber panel, placing the fiber panel into the mold cavity, compressing the fiber panel in the mold cavity to form a compression formed component comprising an edge along a periphery and providing a structural substrate having a shape and a thickness along the edge and injecting resin into the mold cavity with the structural substrate. The shape of the structural substrate may be formed in the mold cavity. A border of the structural substrate may be formed along the thickness of the structural substrate by the resin injected into the mold cavity. A rib for the structural substrate may be formed by the resin injected into the mold cavity. The rib may be formed to extend across an interface between the structural substrate and the border. The compression formed component formed from the fiber panel may comprise variations at the edge along the periphery; the border of the structural substrate formed by injected resin may be configured to provide dimensional accuracy at the edge along the periphery. The step of injecting resin into the mold cavity with the structural substrate may comprise forming the rib from injected resin and forming the border from injected resin; the border formed from injected resin may be configured to provide dimensional accuracy along the edge of the structural substrate. The step of injecting resin into the mold cavity with the structural substrate may comprise forming a reinforcing element on the structural substrate. The vehicle trim component may comprise a cover configured to cover the structural substrate; the cover may be comprised of at least one of (a) woven fabric, (b) non-woven fabric, (c) an applique, (d) vinyl, (e) foam, (f) foil, (g) leather; (h) coverstock.

The present invention relates to a vehicle trim component comprising a fiber panel compression formed in a mold cavity. The vehicle trim component may be prepared by a process comprising the steps of heating the fiber panel, placing the fiber panel into the mold cavity, compressing the fiber panel in the mold cavity to form a compression formed component comprising an edge along a periphery and providing a structural substrate having a shape and a thickness along the edge and injecting resin into the mold cavity with the structural substrate. The shape of the structural substrate may be formed in the mold cavity. A border of the structural substrate may be formed along the thickness of the structural substrate by the resin injected into the mold cavity. The step of injecting resin into the mold cavity with the structural substrate may comprise filling a void within the mold cavity with the structural substrate with injected resin. The process may comprise the step of penetrating the fiber panel with at least one pin to secure the fiber panel in the mold cavity so that the void is created in the structural substrate formed from the fiber panel by the at least one pin. The step of penetrating the fiber panel with at least one pin may comprise withdrawing the at least one pin from the fiber panel before injecting resin into the mold cavity. The void may comprise a gap within the mold cavity. The step of injecting resin into the mold cavity may comprise forming the border by injecting resin in the gap within the mold cavity between the structural substrate and the mold cavity. The step of injecting resin into the mold cavity may comprise forming at least one of (a) an ancillary component; (b) an ancillary component formed from resin; (c) a rib; (d) a rib formed from resin; (e) a resin feature; (f) a resin feature formed from resin filled in a void between the first surface and the second surface of the fiber panel of the structural substrate; (g) a resin component; (h) a resin component formed in a shape; (i) a connector configured to facilitate coupling with at least one of (1) a door frame, (2) an instrument panel, (3) a support structure within the vehicle interior. The step of placing the fiber panel into the mold cavity may comprise placing a cover in the mold cavity and placing the fiber panel on the cover; the cover may be comprised of at least one of (a) woven fabric, (b) non-woven fabric, (c) an applique, (d) vinyl, (e) foam, (f) foil, (g) leather.

The present invention relates to a vehicle trim component comprising a fiber panel compression formed in a mold cavity. The vehicle trim component may be prepared by a process comprising the steps of heating the fiber panel, placing the fiber panel into the mold cavity, compressing the fiber panel in the mold cavity to form a compression formed component comprising an edge along a periphery and providing a structural substrate having a shape and a thickness along the edge and injecting resin into the mold cavity with the structural substrate. The shape of the structural substrate may be formed in the mold cavity. A border of the structural substrate may be formed along the thickness of the structural substrate by the resin injected into the mold cavity. The structural substrate may provide at least one void. The step of injecting resin into the mold cavity with the structural substrate may comprise forming a resin feature in the at least one void of the structural substrate. The resin feature may comprise a reinforcing element configured to reinforce the structural substrate in the at least one void. The resin feature may be configured to provide a weakened zone in the structural substrate configured to facilitate separation of the reinforcing element from the structural substrate for deployment of an airbag. The resin feature may be formed along at least a portion of a first surface of the structural substrate and along at least a portion of a second surface of the structural substrate to couple the resin feature to the structural substrate. The at least one void may comprise an opening in the structural substrate and the resin feature may be configured to fill the opening to form a substantially continuous surface. The structural substrate and the resin feature may be configured to provide a substantially continuous structure. A shape of the structural substrate may comprise a first curvature; the resin feature may comprise a resin component comprising a second curvature different than the first curvature of the structural substrate. The step of injecting resin into the mold cavity with the structural substrate may comprise at least one of: (a) the mold cavity providing dimensional accuracy for injected resin, (b) injecting resin into the at least one void, (c) injecting resin into a gap within the fiber panel, (d) injecting resin into a gap, (e) injecting resin to fill a gap to form a structure from resin, (f) injecting resin to form an element, (g) injecting resin to form a reinforcing element, (h) injecting resin to form an element on a side of the fiber panel, (i) injecting resin to form the shape, (j) injecting resin to form a resin part, (k) injecting resin to form a resin feature, (l) injecting resin to form a resin feature within a void of the fiber panel, (m) injecting resin to form a resin feature formed within a gap of the fiber panel, (n) injecting resin to form a resin feature providing an opening, (o) injecting resin to form a resin feature comprising an ancillary component, (p) injecting resin to form a resin feature comprising a connector, (q) injecting resin to form a resin feature comprising a mount, (r) injecting resin to form a resin feature comprising a substantially smooth texture, (s) injecting resin to form a resin feature comprising a rib, (t) injecting resin to form a resin feature comprising a rib to extend between an interface of the fiber panel and the border, (u) injecting resin to form ribs to extend between the fiber panel and the border.

The present invention relates to a vehicle trim component for a vehicle interior formed from a fiber panel and resin comprising a structural substrate comprising the fiber panel providing a periphery and a border comprising resin formed along the periphery of the structural substrate. The periphery of the structural substrate may comprise an edge providing a thickness; the border comprising resin may be formed along the thickness of the edge of the structural substrate. The border comprising resin formed on the edge at the periphery of the structural substrate may comprise a resin border providing an edge configured to provide dimensional accuracy. The edge of the structural substrate may comprise variations along the periphery; the border formed along the periphery of the structural substrate may comprise a resin border configured to provide an edge with dimensional accuracy along the periphery despite variations of the edge of the structural substrate. The border comprising resin may be bonded to the structural substrate along the thickness of the structural substrate. The border comprising resin may comprise a resin border. The vehicle trim component may further comprise a resin component; the resin component may comprise a rib extending across an interface between the structural substrate and the resin border. The vehicle trim component may comprise a cover configured to cover the structural substrate; the cover may be comprised of at least one of (a) woven fabric, (b) non-woven fabric, (c) an applique, (d) vinyl, (e) foam, (f) foil, (g) leather; (h) coverstock.

The present invention relates to a vehicle interior component formed from a fiber panel and resin comprising a structural substrate comprising the fiber panel providing a periphery between a first surface of the fiber panel and a second surface of the fiber panel and a resin border formed from resin along at least a portion of the periphery of the structural substrate. The resin border may provide an edge along the periphery of the structural substrate. The structural substrate may comprise variations at the periphery; the resin border providing the edge along the periphery of the structural substrate may be configured to provide dimensional accuracy at the periphery. The structural substrate and resin border may comprise a trim component; the resin border providing an edge along the periphery of the structural substrate may be configured to provide dimensional accuracy for the trim component. The vehicle interior component may comprise at least one of (a) an ancillary component; (b) an ancillary component formed from resin; (c) a rib; (d) a rib formed from resin; (e) a resin feature; (f) a resin feature formed from resin filled in a void between the first surface and the second surface of the fiber panel of the structural substrate; (g) a resin component; (h) a resin component formed in a shape; (i) a connector configured to facilitate coupling with at least one of (1) a door frame, (2) an instrument panel, (3) a support structure within the vehicle interior. The structural substrate and the resin border may comprise a trim component; the trim component may comprise a reinforcing element configured (a) to support the structural substrate and/or (b) to reduce the weight of the trim component by facilitating a reduction in a thickness of the structural substrate. The vehicle interior component may comprise a rib configured to extend across an interface between the structural substrate and the resin border and configured to strengthen the interface. The fiber panel of the structural substrate may comprise a compression formed component; the edge of the resin border may be configured to provide dimensional accuracy along the periphery of the structural substrate.

The present invention relates to a vehicle interior component formed from a compressed fiber panel and injected resin comprising a structural substrate comprising the compressed fiber panel and a resin feature formed from the injected resin. The structural substrate may comprise a shape providing a first surface and a second surface and at least one void. The resin feature may be formed in the at least one void of the structural substrate. The at least one void may comprise a gap between the first surface and the second surface of the structural substrate; the resin feature may comprise a reinforcing element configured to reinforce the structural substrate in the gap between the first surface and the second surface of the structural substrate. The resin feature may be configured to provide a weakened zone extending along the first surface of the structural substrate configured to facilitate separation of the reinforcing element from the structural substrate for deployment of an airbag. The gap in the structural substrate may comprise an opening in the structural substrate and the resin feature may be configured to fill the gap to form a substantially continuous surface. The resin feature may be formed along at least a portion of the first surface of the structural substrate and along at least a portion of the second surface of the structural substrate to couple the resin feature to the structural substrate. The structural substrate and the resin feature may be configured to provide a substantially continuous structure. The shape of the structural substrate may comprise a first curvature; the resin feature may comprise a resin component comprising a second curvature different than the first curvature of the structural substrate.

The present invention relates to a vehicle trim component comprising a fiber panel compression formed into a structural substrate. The vehicle trim component may be prepared by a process comprising the steps of (a) heating the fiber panel, (b) disposing the fiber panel onto a first surface of a mold cavity, (c) compressing the fiber panel between the first surface and a second surface of the mold cavity as the fiber panel cools to form the fiber panel into a compression formed component having a shape corresponding to a first contour of the first surface and a second contour of the second surface and comprising an edge providing a thickness of the structural substrate, (d) injecting resin into the mold cavity after the compression formed component is formed to fill at least one void between the first surface and the second surface adjacent to the compression formed component and along the thickness of the structural substrate, and (e) removing the vehicle trim component comprising the structural substrate from the mold cavity. The resin injected into the mold cavity may form a border at the edge of the compression formed component providing the thickness of the structural substrate. The process may comprise disposing a cover stock onto the vehicle trim component to form a show surface. The process may comprise trimming at least one edge of the fiber panel to a dimension prior to disposing the fiber panel onto the first surface of the mold cavity. The shape of the compression formed component may be different than an original shape of the fiber panel. The process may comprise injecting resin into the mold cavity to fill at least one void between the compression formed component and the first surface to form an ancillary component of the vehicle trim component. The process may comprise injecting resin into the mold cavity to fill at least one void between the compression formed component and the second surface to form an ancillary component of the vehicle trim component. The edge providing the thickness may extend about at least a portion of a periphery of the compression formed component such that injecting resin into the mold cavity may form a border disposed about a portion of the periphery of the compression formed component. The mold cavity may provide dimensional accuracy for the border at the edge of the compression formed component providing the thickness of the structural substrate. Heating the fiber panel may comprise heating a plurality of structural fibers and a thermoplastic resin to a temperature sufficient to liquefy the thermoplastic resin. Cooling the fiber panel into a compression formed component may comprise solidifying the thermoplastic resin. The fiber panel may comprise edges having variations. The border of the structural substrate formed from the fiber panel may provide dimensional accuracy despite variations in the edges of the fiber panel. The fiber panel may comprise a plurality of fibers and a thermoplastic resin. The fiber panel may be heated to a temperature to at least partially liquefy the thermoplastic resin. The fiber panel may be disposed onto the first surface of the mold cavity after the fiber panel is heated. The fiber panel may be cooled in the mold cavity to solidify the thermoplastic resin and to form the fiber panel into the compression formed component. The fiber panel may comprise a plurality of fibers and a thermoset resin. The mold may be heated to cure the thermoset resin and to form the fiber panel into the compression formed component. Disposing the fiber panel onto the first surface of the mold cavity may comprise positioning a cover on the first surface of the mold cavity and disposing the fiber panel on the cover. The cover may bind to the fiber panel. The cover may be comprised of at least one of (a) woven fabric, (b) non-woven fabric, (c) an applique, (d) vinyl, (e) foam, (f) foil, (g) leather.

The present invention relates to a vehicle trim component comprising a fiber panel compression formed in a mold cavity. The vehicle trim component may be prepared by a process comprising the steps of (a) heating the fiber panel, (b) placing the fiber panel into the mold cavity, (c) compressing the fiber panel in the mold cavity to form a compression formed component comprising an edge along a periphery and providing a structural substrate having a shape and a thickness along the edge and (d) injecting resin into the mold cavity with the structural substrate. The shape of the structural substrate may be formed in the mold cavity. A border of the structural substrate may be formed along the thickness of the structural substrate by the resin injected into the mold cavity. A rib extending across an interface between the structural substrate and the border may be formed by the resin injected into the mold cavity. The structural substrate may comprise a gap. The gap may be filled by the resin injected into the mold cavity. The process may comprise the step of penetrating the fiber panel with at least one pin to secure the fiber panel to the mold cavity and substantially block movement of the fiber panel within the mold cavity.

The present invention relates to a vehicle trim component comprising a fiber panel configured to be compression formed into a structural substrate in a mold cavity comprising a first surface and a second surface. The vehicle trim component may be prepared by a process comprising the steps of (a) heating the fiber panel, (b) placing the fiber panel into the mold cavity, (c) compressing the fiber panel between the first surface and the second surface of the mold cavity to form the fiber panel into a compression formed component providing the structural substrate having a shape and thickness along an edge and (d) injecting resin into the mold cavity with the structural substrate. The shape of the structural substrate may be configured to be formed between the first surface of the mold cavity and the second surface of the mold cavity. A border may be formed on the structural substrate along the thickness at the edge of the structural substrate by the resin injected into the mold cavity. A rib extending across an interface between the structural substrate and the border may be formed by the resin injected into the mold cavity. The structural substrate may comprise a gap. The gap may be filled by the resin injected into the mold cavity. The process may comprise the step of penetrating the fiber panel with at least one pin to secure the fiber panel to the mold cavity and substantially block movement of the fiber panel within the mold cavity. The step of injecting resin into the mold cavity with the structural substrate may comprise at least one of: the mold cavity providing dimensional accuracy for the injected resin; injecting resin into a void; injecting resin into a void that corresponds to a gap within the fiber panel; injecting resin into a gap; injecting resin to fill a gap to form a structure from resin; injecting resin to form an element; injecting resin to form a reinforcing element; injecting resin to form an element on a side of the fiber panel; injecting resin to form the shape; injecting resin to form a resin part; injecting resin to form a resin feature; injecting resin to form a resin feature within a void of the fiber panel; injecting resin to form a resin feature formed within a gap of the fiber panel; injecting resin to form a resin feature providing an opening; injecting resin to form a resin feature comprising an ancillary component; injecting resin to form a resin feature comprising a connector; injecting resin to form a resin feature comprising a mount; injecting resin to form a resin feature comprising a substantially smooth texture; injecting resin to form a resin feature comprising a rib; injecting resin to form a resin feature comprising a rib to extend between an interface of the fiber panel and the border; injecting resin to form ribs to extend between the fiber panel and the border.

The present invention relates to a method of manufacturing a vehicle trim component comprising: disposing a fiber panel onto a first surface of a mold cavity, compressing the fiber panel between the first surface and a second surface of the mold cavity to form the fiber panel into a desired shape and injecting resin into the mold cavity to fill at least one void between the first surface and the second surface adjacent to the fiber panel. The method may comprise trimming at least one edge of the fiber panel to a desired dimension prior to disposing the fiber panel onto the first surface of the mold cavity. The method may comprise heating the fiber panel prior to disposing the fiber panel onto the first surface of the mold cavity. The fiber panel may comprise a plurality of structural fibers and a thermoplastic resin; heating the fiber panel may comprise heating the fiber panel to a temperature sufficient to liquefy the thermoplastic resin. The fiber panel may comprise a plurality of structural fibers and a thermoset resin; heating the fiber panel may comprise heating the fiber panel to a temperature sufficient to cure the thermoset resin. The method may comprise injecting resin into the mold cavity to fill at least one secondary void between the fiber panel and the second surface to form an ancillary component of the vehicle trim component. The at least one void may be shaped to form a lap joint between the fiber panel and a resin component. The method may comprise removing the vehicle trim component from the mold cavity and disposing a cover stock onto the vehicle trim component to form a show surface. The at least one void may extend about at least a portion of a periphery of the fiber panel. The at least one void may correspond to a gap within the fiber panel, and the gap may be enclosed by material of the fiber panel.

The present invention relates to a vehicle trim component prepared by a process comprising: disposing a fiber panel onto a first surface of a mold cavity, compressing the fiber panel between the first surface and a second surface of the mold cavity to form the fiber panel into a desired shape and injecting resin into the mold cavity to fill at least one void between the first surface and the second surface adjacent to the fiber panel. The process may comprise removing the vehicle trim component from the mold cavity and disposing a cover stock onto the vehicle trim component to form a show surface. The process may comprise trimming at least one edge of the fiber panel to a desired dimension prior to disposing the fiber panel onto the first surface of the mold cavity. The process may comprise heating the fiber panel prior to disposing the fiber panel onto the first surface of the mold cavity. The process may comprise injecting resin into the mold cavity to fill at least one secondary void between the fiber panel and the second surface to form an ancillary component of the vehicle trim component.

The present invention relates to a mold cavity for manufacturing a vehicle trim component comprising: a first surface configured to receive a fiber panel, a second surface configured to compress the fiber panel between the first surface and the second surface to form the fiber panel into a desired shape and at least one fluid pathway configured to inject resin into a void between the first surface and the second surface adjacent to the fiber panel. The at least one void may extend about at least a portion of a periphery of the fiber panel. The at least one void may correspond to a gap within the fiber panel; the gap may be enclosed by material of the fiber panel. The mold cavity may comprise at least one secondary fluid pathway configured to inject resin into a secondary void between the fiber panel and the second surface to form an ancillary component of the vehicle trim component. The mold cavity may be configured to cool the fiber panel to facilitate hardening of a thermoplastic resin, a thermoset resin, or a combination thereof, within the fiber panel.

The present invention relates to a vehicle trim component prepared by a process comprising heating a fiber panel, disposing the fiber panel onto a first surface of a mold cavity, compressing the fiber panel between the first surface and a second surface of the mold cavity as the fiber panel cools to form the fiber panel into a compression formed component having a shape wherein the shape corresponds to a first contour of the first surface and a second contour of the second surface, injecting resin into the mold cavity after the compression formed component is formed to fill at least one void between the first surface and the second surface adjacent to the compression formed component and removing the vehicle trim component from the mold cavity. The process may comprise disposing a cover stock onto the vehicle trim component to form a show surface. The process may comprise trimming at least one edge of the fiber panel to a dimension prior to disposing the fiber panel onto the first surface of the mold cavity. The shape of the compression formed component may be different than an original shape of the fiber panel. The process may comprise injecting resin into the mold cavity to fill at least one secondary void between the compression formed component and the first surface to form an ancillary component of the vehicle trim component. The process may comprise injecting resin into the mold cavity to fill at least one secondary void between the compression formed component and the second surface to form an ancillary component of the vehicle trim component. The at least one void may extend about at least a portion of a periphery of the compression formed component such that injecting resin into the mold cavity forms a border disposed about the at least the portion of the periphery of the compression formed component. The at least one void may correspond to a gap within the fiber panel; the gap may be enclosed by material of the fiber panel. Heating the fiber panel may comprise heating a plurality of structural fibers and a thermoplastic resin to a temperature sufficient to liquefy the thermoplastic resin. Cooling the fiber panel into a compression formed component may comprise solidifying the thermoplastic resin.

The present invention relates to a vehicle trim component formed from a fiber panel comprising a plurality of fibers and a first resin by a method of manufacturing comprising the steps of heating the fiber panel to a temperature to at least partially liquefy the first resin, disposing the fiber panel into a cavity of a mold after the fiber panel is heated, compressing the fiber panel in the mold between a first surface and a second surface of the cavity, cooling the fiber panel in the mold to solidify the first resin and to form the fiber panel into a compression formed component and injecting a second resin into the cavity of the mold to fill at least one void in the cavity of the mold to form the vehicle trim component. The at least one void may extend between the first surface and the second surface adjacent to the compression formed component having a shape. The vehicle trim component may comprise the fiber panel and a resin feature bonded to the compression formed component. The method may comprise the step of trimming at least one edge of the fiber panel to a dimension prior to disposing the fiber panel onto the first surface of the mold cavity. The method may comprise injecting the second resin into the mold cavity to fill at least one secondary void between the compression formed component and the first surface to form an ancillary component of the vehicle trim component. The method may comprise injecting the second resin into the mold cavity to fill at least one secondary void between the compression formed component and the second surface to form an ancillary component of the vehicle trim component. The fiber panel may comprise a plurality of structural fibers. The at least one void may extend about at least a portion of a periphery of the compression formed component such that injecting the second resin into the mold cavity may form a border disposed about the at least the portion of the periphery of the compression formed component. The first resin may comprise a thermoset or thermoplastic.

The present invention relates to a vehicle trim component formed from a fiber sheet comprising a plurality of structural fibers of a first material comprising: a component formed from the fiber sheet and a second material disposed in a gap of the fiber sheet or at a periphery of the fiber sheet. The second material may extend from the first surface of the fiber sheet to the second surface of the fiber sheet. The fiber sheet may comprise a first surface and a second surface. The first material may comprise fibers. The second material may comprise a resin. The component may be formed by compressing the fiber sheet in a mold to establish a shape. The fibers may comprise thermoplastic fibers. The gap of the fiber sheet may enable the second material to flow from the first surface of the fiber sheet to the second surface of the fiber sheet during an injection molding process. The component may be formed by heating the fiber sheet before compressing the fiber sheet and cooling the fiber sheet while the fiber sheet is in the mold to form the fiber sheet into the component. The shape may substantially correspond to a first contour of a first surface of a cavity of the mold and a second contour of a second surface of the cavity of the mold. The second material may extend outwardly from the first surface or the second surface to form an ancillary component of the vehicle trim component.

The present invention relates to a method of manufacturing a vehicle trim component comprising disposing a fiber panel onto a first surface of a mold cavity. The method may comprise compressing the fiber panel between the first surface and a second surface of the mold cavity to form the fiber panel into a desired shape. The method may comprise injecting resin into the mold cavity to fill at least one void between the first surface and the second surface adjacent to the fiber panel.

The present invention relates to a vehicle trim component prepared by a process comprising disposing a fiber panel onto a first surface of a mold cavity. The process may comprise compressing the fiber panel between the first surface and a second surface of the mold cavity to form the fiber panel into a desired shape. The process may comprise injecting resin into the mold cavity to fill at least one void between the first surface and the second surface adjacent to the fiber panel.

The present invention relates to a mold cavity for manufacturing a vehicle trim component comprising a first surface configured to receive a fiber panel. The mold cavity may comprise a second surface configured to compress the fiber panel between the first surface and the second surface to form the fiber panel into a desired shape. The mold cavity may comprise at least one fluid pathway configured to inject resin into a void between the first surface and the second surface adjacent to the fiber panel.

The present invention relates to a mold assembly for manufacturing a vehicle trim component. The mold assembly may comprise a first mold element configured to receive a fiber panel, and a retractable pin assembly having multiple holding pins configured to penetrate the fiber panel to secure the fiber panel to the first mold element. The mold assembly may comprise a second mold element configured to compress the fiber panel between a first surface of the first mold element and a second surface of the second mold element to form the fiber panel into a desired shape. The retractable pin assembly may be configured to withdraw the holding pins from the fiber panel prior to or during compression of the fiber panel between the first and second surfaces.

The present invention relates to a mold assembly for manufacturing a vehicle trim component. The mold assembly may comprise a first mold element configured to receive a fiber panel, and a second mold element configured to compress the fiber panel between a first surface of the first mold element and a second surface of the second mold element to form the fiber panel into a desired shape. The mold assembly may comprise a fluid pathway configured to inject resin onto adjacent inner surfaces of a bent edge of the fiber panel such that the resin extends to a distal end of the bent edge.

The present invention relates to a mold assembly for manufacturing a vehicle trim component. The mold assembly may comprise a first mold element and a second mold element configured to be brought together to compress a fiber panel into a desired shape. The mold assembly may comprise a trim blade configured to penetrate the fiber panel as the first and second mold elements are brought together to trim the fiber panel to desired dimensions. The mold assembly may comprise a floating core assembly coupled to the second mold element and configured to urge the fiber panel against a surface of the first mold element before the trim blade penetrates the fiber panel.

FIGURES

FIG. 6 is a schematic perspective view of an embodiment of a vehicle trim component manufactured by concurrent compression forming and injection molding, showing the process of applying a cover stock.

FIG. 7 is a schematic front view of an embodiment of a vehicle trim component manufactured by concurrent compression forming and injection molding, including a weakened zone configured to facilitate airbag deployment.

FIG. 8 is a schematic cross-sectional view of an embodiment of a vehicle trim component manufactured by concurrent compression forming and injection molding, including a reinforcement element extending through a fiber panel.

FIG. 9 is a schematic cross-sectional view of an embodiment of a vehicle trim component manufactured by concurrent compression forming and injection molding, including a high curvature element formed within a gap in a fiber panel.

FIG. 10 is a schematic cross-sectional view of an embodiment of a vehicle trim component manufactured by concurrent compression forming and injection molding, including a lap joint between a resin component and a fiber panel.

DESCRIPTION

Figure 1:
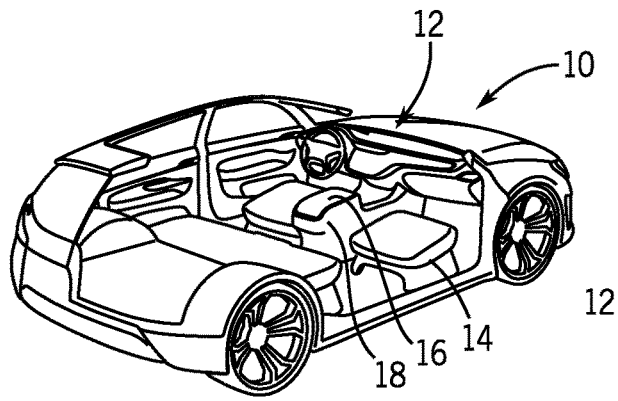
FIG. 1 is a schematic perspective view of an exemplary vehicle that may include a trim component manufactured by a concurrent compression forming and injection molding process.

FIG. 1 is a schematic perspective view of an exemplary vehicle 10 that may include a trim component manufactured by a concurrent compression forming and injection molding process. Vehicle 10 may comprise an interior 12 having a seat 14, an armrest 16 and a center console 18. Certain trim components of seat 14, armrest 16, center console 18 and/or other areas within interior 12 may be manufactured by a concurrent compression forming and injection molding process. A vehicle trim component may be prepared by a process including disposing a fiber panel onto a first surface of a mold cavity, and compressing the fiber panel between the first surface and a second surface of the mold cavity to form the fiber panel into a desired shape. Resin may be injected into the mold cavity to fill a void between the first surface and the second surface adjacent to the fiber panel. The void may extend about a periphery of the fiber panel. The injected resin may fill the void and establish a border about the fiber panel as the resin hardens and/or cures. Due to the dimensional accuracy of the mold cavity, each edge of the resultant trim component may substantially correspond to the desired dimensions. The process of trimming the edges of the component after formation may be obviated, thereby decreasing the duration of the manufacturing process and reducing the quantity of offal that may otherwise be deposited in a landfill.

Resin may be injected into at least one secondary void between the fiber panel and the second surface to form an ancillary component of the vehicle trim component. The mold cavity may comprise multiple secondary voids configured to establish ribs along a surface of the fiber panel. The ribs may be configured to support the fiber panel, providing a stronger component, and/or reducing the weight of the component by facilitating a reduction in fiber panel thickness. Because the fiber panel and the ancillary components are formed within a single mold cavity, the process of transferring the part between a compression mold and an injection mold is obviated, thereby reducing the duration of the manufacturing process. Employing a single mold reduces design and manufacturing costs, as compared to producing a first mold for the compression forming process and a second mold for the injection molding process.

Figure 2:
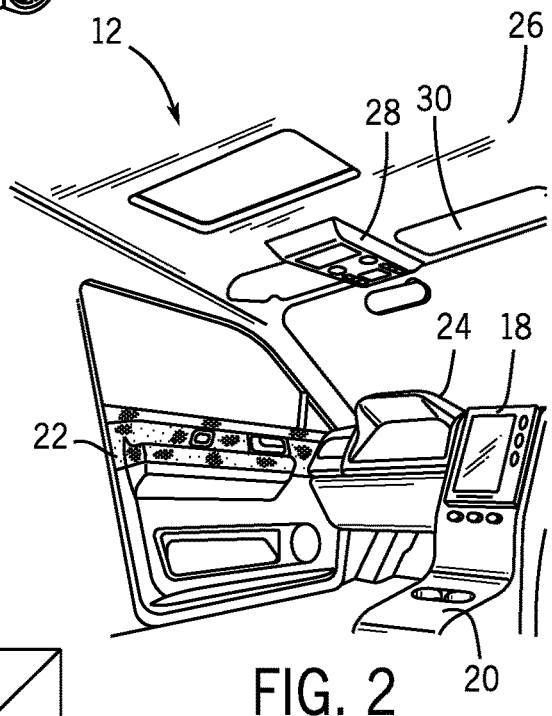
FIG. 2 is a schematic perspective view of a part of the interior of the vehicle of FIG. 1.

FIG. 2 is a schematic perspective view of a part of the interior of the vehicle of FIG. 1. According to an exemplary embodiment, vehicle interior 12 may comprise various elements, such as center console 18, floor console 20, interior door panel 22, instrument panel 24, headliner 26, overhead console 28 and sun visor 30. Each element of vehicle interior 12 may comprise one or more trim components manufactured by a combination of compression forming and injection molding. The concurrent compression forming and injection molding process may facilitate formation of a trim component having dimensionally accurate edges, obviating the post-molding trimming process. By forming the fiber panel and molding certain ancillary components within a single mold cavity, the duration of the manufacturing process may be substantially reduced, as compared to processes that include a first compression mold and a second injection mold.

Figure 3:
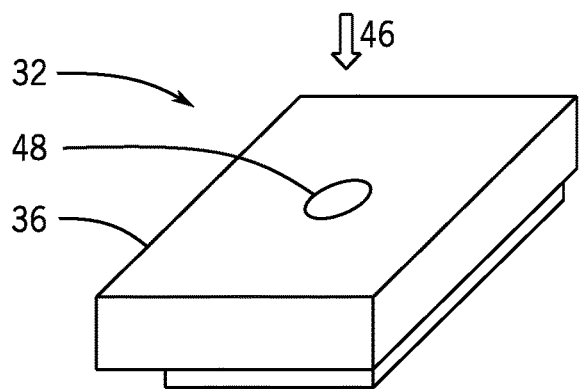
FIG. 3 is a schematic perspective view of an embodiment of a molding assembly configured to produce a trim component via concurrent compression forming and injection molding.
Figure 3:
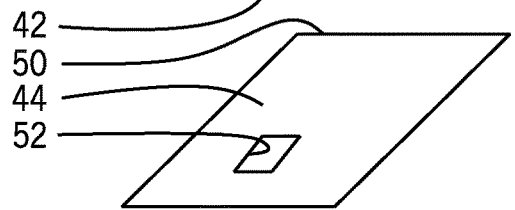
Figure 3:
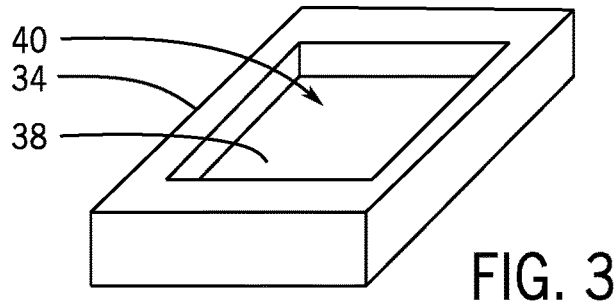

FIG. 3 is a schematic perspective view of an embodiment of a molding assembly 32 configured to produce a trim component via concurrent compression forming and injection molding. According to an exemplary embodiment, molding assembly 32 may comprise a first (e.g., lower) mold element 34 and a second (e.g., upper) mold element 36. First mold element 34 may comprise a first surface 38 defining a first portion of a mold cavity 40, and second mold element 36 may comprise a second surface 42 defining a second portion of mold cavity 40. First surface 38 may be configured to receive a fiber panel 44, and second surface 42 may be configured to compress fiber panel 44 against first surface 38 to form fiber panel 44 into a desired shape.

According to an exemplary embodiment, fiber panel 44 may comprise a combination of structural fibers and thermoplastic resin. The structural fibers may comprise natural fibers, such as hemp, wood, flax, kenaf and sisal, and/or synthetic fibers, such as glass fibers, carbon fibers and polymeric fibers. The thermoplastic resin may comprise polypropylene (PP), acrylonitrile butadiene styrene (ABS) and/or polycarbonate (PC) binders, for example. Fiber panel 44 may be constructed from about 50 percent natural fibers and about 50 percent PP. To facilitate compression forming, fiber panel 44 is heated (e.g., to about 200 degrees Celsius) to induce the thermoplastic resin to liquefy. Fiber panel 44 is then disposed onto first surface 38 of cavity 40 and compressed between first surface 38 and second surface 42 as second mold element 36 is driven toward first mold element 34 along direction 46. As fiber panel 44 cools within mold assembly 32, the thermoplastic solidifies, establishing a substantially rigid composite panel that conforms to the shape of mold cavity 40.

According to an exemplary embodiment, fiber panel 44 may comprise a combination of structural fibers and a thermoset resin. The structural fibers may comprise natural fibers, such as hemp, wood, flax, kenaf and sisal, and/or synthetic fibers, such as glass fibers, carbon fibers and polymeric fibers. The thermoset resin may comprise epoxy resin, polyimide resin, polyester resin and/or vinylester resin. Fiber panel 44 may be constructed from Fibrowood, which is manufactured by Johnson Controls Technology Company of Holland, Mich. To facilitate compression forming, fiber panel 44 may be disposed onto first surface 38 of cavity 40 and compressed between first surface 38 and second surface 42 as second mold element 36 is driven toward first mold element 34 along direction 46. During the compression process, panel 44 is heated (e.g., via a heated mold assembly 32), inducing the thermoset resin to cure. A substantially rigid composite panel that conforms to the shape of mold cavity 40 is formed.

According to an exemplary embodiment, after fiber panel 44 is compressed between first surface 38 and second surface 42, resin is injected into the mold cavity (e.g., via port 48) to fill at least one void between first surface 38 and second surface 42 adjacent to fiber panel 44. According to an exemplary embodiment, the void extends about a periphery 50 of fiber panel 44. The injected resin will fill the void, and establish a border about fiber panel 44 as the resin hardens and/or cures. Due to the dimensional accuracy of the mold cavity, each edge of the resultant trim component will substantially correspond to the desired dimensions. The process of trimming the edges of the component after formation may be obviated, decreasing the duration of the manufacturing process, and reducing the quantity of offal that may otherwise be deposited in a landfill.

According to an exemplary embodiment, the void corresponds to a gap 52 within fiber panel 44. The resin will fill the gap, thereby establishing a substantially continuous structure. Gap 52 may be configured to establish a weakened zone extending along the interface between fiber panel 44 and the molded resin within gap 52. The weakened zone may be configured to facilitate separation of the molded resin from fiber panel 44, thereby enabling deployment of an airbag. The resin may fill gaps 52 formed by unintentional tearing of fiber panel 44 during the compression forming process, thereby forming a trim component having a substantially continuous surface. Gap 52 may be configured to establish a high curvature region of the trim component. Mold cavity 40 may be contoured to form the fiber panel into a shape having a relatively low curvature and to form the resin into an element having a high curvature. A trim component having a desired shape and structural properties may be formed. While fiber panel 44 may comprise a single gap 52, alternative fiber panels 44 may comprise additional gaps to establish weakened zones, to fill torn areas of the fiber panel and/or to form high curvature regions of the trim component.

Figure 4:
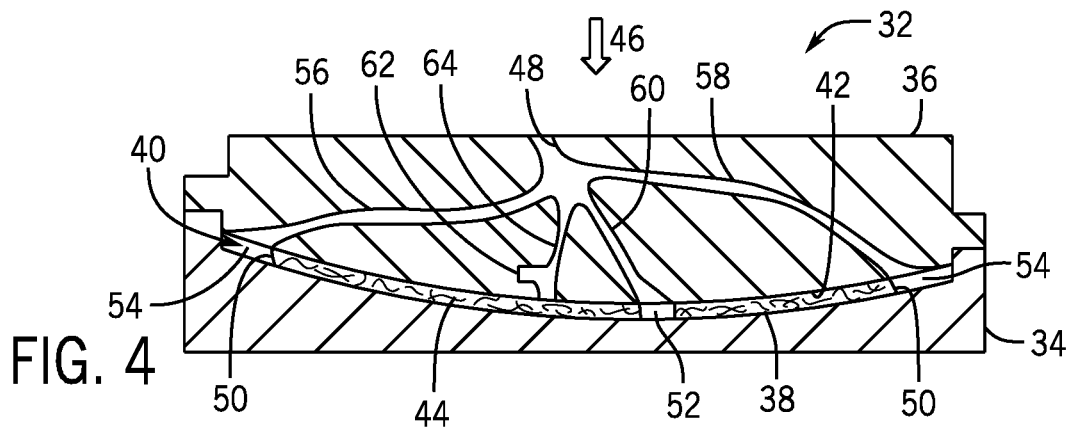
FIG. 4 is a schematic cross-sectional view of an embodiment of a molding assembly in a closed position.

FIG. 4 is a schematic cross-sectional view of an embodiment of a molding assembly 32 in a closed position. According to an exemplary embodiment, mold cavity 40 may comprise a void 54 extending about periphery 50 of fiber panel 44. Resin may be injected into void 54 to establish a border about fiber panel 44 as the resin hardens and/or cures. In the illustrated embodiment, molding assembly 32 may comprise a first fluid pathway 56 extending between port 48 and a first portion of void 54, and a second fluid pathway 58 extending between port 48 and a second portion of void 54. When liquid resin is injected into port 48, the resin will flow into void 54, thereby establishing a border surrounding fiber panel 44. Molding assembly 32 may comprise a third fluid pathway 60 extending between port 48 and gap 52, facilitating resin flow to gap 52.

According to an exemplary embodiment, mold cavity 40 may comprise a secondary void 62 positioned between fiber panel 44 and second surface 42 of mold cavity 40. Secondary void 62 may be configured to form an ancillary component of the vehicle trim component, such as a support rib or a connector. A fourth fluid pathway 64 extends between port 48 and second void 62. When liquid resin is injected into port 48, the resin will flow into void 62, establishing the ancillary component as the resin cures and/or hardens.

According to an exemplary embodiment, a fiber panel 44 is disposed onto first surface 38 of mold cavity 40, and fiber panel 44 is compressed between first surface 38 and second surface 42 of mold cavity 40 to form fiber panel 44 into the desired shape. As fiber panel 44 solidifies within mold cavity 40, resin is injected into port 48, thereby filling voids 52, 54 and 62. As the resin cures and hardens, the resin binds to fiber panel 44, thereby forming a trim component having the desired shape, structural properties and/or ancillary components. According to an exemplary embodiment, the resin may comprise a thermoplastic material, such as polypropylene (PP), acrylonitrile butadiene styrene (ABS) or polycarbonate (PC), or a thermoset material, such as epoxy resin, polyimide resin, polyester resin or vinylester resin. The resin is injected into the mold in a liquid state, and solidifies as the resin cures/hardens. Resin parts are formed having shapes corresponding to the shapes of the respective voids within mold cavity 40. According to an exemplary embodiment, the injected resin may be molded with a cellular structure (e.g., via a chemical or mechanical blowing agent), to reduce a mass of the trim component and/or to enhance processing properties.

Figure 5:
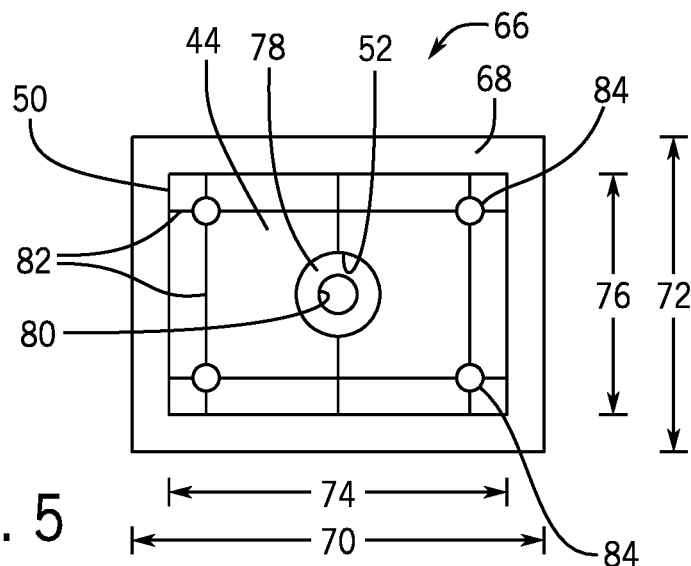
FIG. 5 is a schematic front view of an embodiment of a vehicle trim component manufactured by concurrent compression forming and injection molding.
Figure 5A:
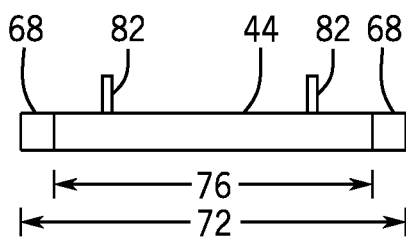
FIGS. 5A to 5D are schematic side elevation views of a component of the type shown in FIG. 5 according to an exemplary embodiment.
Figure 5C:
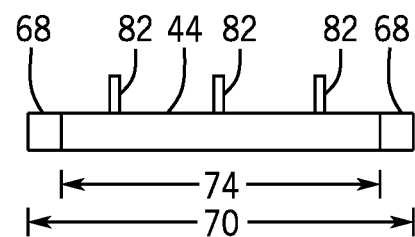
Figure 5B:
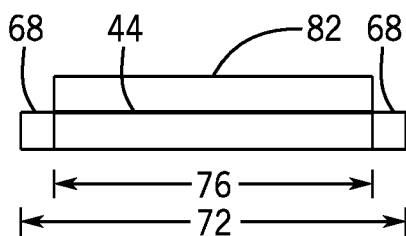
Figure 5D:
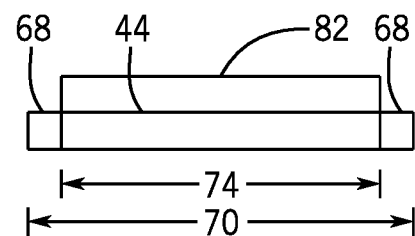

FIG. 5 is a schematic front view of an embodiment of a vehicle trim component 66 manufactured by concurrent compression forming and injection molding. See also FIGS. 5A to 5D (schematic side elevation views according to an exemplary embodiment). According to an exemplary embodiment, trim component 66 may comprise a fiber panel 44 and a resin border 68 disposed about periphery 50 of fiber panel 44. The dimensional accuracy of mold cavity 40 facilitates formation of a resin border 68 having desired dimensions, thereby obviating the post-formation panel trimming process. To form a trim component 66 having a width 70 and a length 72, fiber panel 44 is trimmed to a width 74 smaller than desired width 70, and to a length 76 smaller than desired length 72. Fiber panel 44 is then placed within a mold cavity 40 having the desired dimensions (i.e., a width 70 and a height 72). After panel 44 is compressed between first surface 38 and second surface 42, resin is injected into void 54 surrounding periphery 50, forming border 68 and establishing a trim component 66 having the desired dimensions.

Because fiber panel 44 is trimmed prior to the compression forming process, the offal (i.e., excess material) may be recycled. Recycling post-formation offal may be more difficult because the thermoset resin within the fiber panel has cured/hardened, and/or the thermoplastic resin has bonded to the structural fibers. Because the resin fills the void between periphery 50 of fiber panel 44 and the edges of mold cavity 40, the edges of trim component 66 may be dimensionally accurate despite variations in the fiber panel edges. The edges of the fiber panel may be trimmed to rough dimensions prior to the compression forming process, substantially reducing the duration associated with fiber panel trimming.

According to an exemplary embodiment, trim component 66 may comprise a resin feature 78 formed within gap 52 of the fiber panel. As illustrated, feature 78 may comprise an opening 80 having dimensionally accurate edges. To form opening 80, mold cavity 40 may comprise a protrusion having the shape of opening 80. As resin is injected into gap 52, the protrusion blocks the flow of resin to opening 80, thereby establishing desired feature 78. Feature 78 may be utilized to secure other components to trim component 66 and/or to secure trim component 66 to vehicle interior 12. While a substantially hexagonal opening 80 is employed within the illustrated embodiment, alternative embodiments may include other opening configurations (e.g., square, circular, elliptical, etc.). Further embodiments may comprise additional features 78 distributed throughout fiber panel 44. Because feature 78 is formed during the concurrent compression forming/injection molding process, the practice of applying a feature to the fiber panel after formation is obviated. The duration and expense associated with trim component manufacturing may be substantially reduced.

According to an exemplary embodiment, trim component 66 may comprise ancillary components coupled to the surface of fiber panel 44. Ancillary components may be formed by injecting resin into a secondary void between the fiber panel and the second surface of the mold cavity. The ancillary components may comprise ribs 82 and connectors 84. Alternative embodiments may comprise other ancillary components, such as pins, mounts, etc. Connectors 84 may be configured to facilitate coupling between trim component 66 and another surface (e.g., door frame, instrument panel support structure, etc.) within interior 12 of vehicle 10. Ribs 82 may be configured to support fiber panel 44, providing a stronger trim component and/or reducing the weight of the trim component by facilitating a reduction in fiber panel thickness. According to an exemplary embodiment, ribs 82 may extend across the interface between fiber panel 44 and border 68 and/or across the interface between fiber panel 44 and resin feature 78. Ribs 82 may enhance the strength of the panel/border interface and/or the panel/feature interface. Because the fiber panel and the ancillary components are formed within a single mold cavity, the process of transferring the part between a compression mold and an injection mold is obviated, reducing the duration of the manufacturing process. Employing a single mold reduces design and manufacturing costs, as compared to producing a first mold for the compression forming process and a second mold for the injection molding process.

FIG. 6 is a schematic perspective view of an embodiment of a vehicle trim component 66 manufactured by concurrent compression forming and injection molding, showing the process of applying a cover stock 86. According to an exemplary embodiment, cover stock 86 is applied to fiber panel 44 (e.g., via an adhesive layer) to form a show surface 88. Cover stock 86 may be a woven or non-woven fabric, an applique, a vinyl layer, a foam layer, a foil layer, or a leather covering, for example. Such a cover stock 86 may establish a show surface 88 that matches vehicle interior 12, thereby enhancing the appearance of trim component 66. According to an exemplary embodiment, cover stock 86 is applied to fiber panel 44 after trim component 66 is formed. According to an exemplary embodiment, the cover stock may be applied during the compression molding process. For example, the cover stock may be positioned between first surface 38 of mold cavity 40 and fiber panel 44 prior to compression forming. As fiber panel 44 solidifies within mold cavity 40, the cover stock may bind to the fiber panel, thereby establishing a desired show surface. Cover stock 86 may be applied to at least a portion of fiber panel 44 and/or at least a portion of a resin component to provide desired show surface 88.

FIG. 7 is a schematic front view of an embodiment of a vehicle trim component manufactured by concurrent compression forming and injection molding, including a weakened zone configured to facilitate airbag deployment. According to an exemplary embodiment, trim component 66 may comprise a resin feature 90 formed within gap 52 of fiber panel 44. According to an exemplary embodiment, resin feature 90 is substantially H-shaped, thereby establishing a long interface between feature 90 and fiber panel 44. The long interface provides a weakened zone, in which a sufficient force applied to trim component 66 will induce separation of resin feature 90 from fiber panel 44. Trim component 66 may be an interior door panel configured to conceal an airbag. Upon deployment, the airbag will apply a force to trim component 66 sufficient to induce separation of resin feature 90 from fiber panel 44, facilitating airbag deployment.

While feature 90 is substantially H-shaped in the illustrated embodiment, alternative embodiments may comprise other weakened zone shapes (e.g., U-shaped, T-shaped, circular, square, etc.). Certain trim components 66 may comprise a substantially continuous fiber panel 44 surrounded by a resin border 68, forming a weakened zone about periphery 50 of fiber panel 44. The trim component may comprise various reinforcing features (e.g., ribs 82, additional fiber panels, thicker resin regions, etc.) configured to particularly adjust the strength of the weakened zone such that the trim component remains substantially intact until the airbag is deployed. The weakened zone between resin feature 90 and fiber panel 44 may be further weakened by scoring (e.g., via in-mold scoring, laser scoring, etc.), ensuring that the force of the airbag induces resin feature 90 to separate from fiber panel 44.

According to an exemplary embodiment, additional elements may be utilized to reinforce the weakened zone and/or to tether components during airbag deployment. After trim component 66 is formed, a flexible panel (e.g., carbon fiber, glass fiber, synthetic fiber, etc.) may be coupled to fiber panel 44 and to resin feature 90. During airbag deployment, the flexible panel may tether resin feature 90 to fiber panel 44, retaining resin feature 90 as resin feature 90 separates from fiber panel 44 at the weakened zone. The flexible panel may be coupled to trim component 66 during the compression forming/injection molding process. The flexible panel may be placed in the mold cavity adjacent to the fiber panel. As fiber panel 44 solidifies within the mold cavity, the flexible panel will bond to the fiber panel. Resin injected into the gap will bond to the flexible panel, thereby establishing a trim component configured to retain resin feature 90 during airbag deployment.

FIG. 8 is a schematic cross-sectional view of an embodiment of a vehicle trim component manufactured by concurrent compression forming and injection molding, including a reinforcement element 92 extending through fiber panel 44. According to an exemplary embodiment, fiber panel 44 may comprise a gap 52 that enables resin to flow through fiber panel 44 during the injection molding process. Portions of resin reinforcement element 92 are formed on each side of fiber panel 44, locking element 92 to panel 44. Due to the thickness of reinforcement element 92, the resin component may provide additional structural rigidity to a region of the trim component that may experience high loading. By combining various resin and fiber elements, a trim component 66 having a desired shape and a desired strength may be formed.

According to an exemplary embodiment, reinforcement element 92 is formed by compressing fiber panel 44 between opposite surfaces of the mold cavity. Once the fiber panel solidifies, at least one of the surfaces is partially retracted, thereby establishing a void having the shape of reinforcement element 92. Resin is then injected into the void to form element 92. According to an exemplary embodiment, the shape of fiber panel 44 adjacent to gap 52 is formed by the pressure of the injected resin. Such embodiments may obviate the step of retracting the mold surface after the compression molding process.

FIG. 9 is a schematic cross-sectional view of an embodiment of a vehicle trim component manufactured by concurrent compression forming and injection molding, including a high curvature element 94 formed within a gap 52 in fiber panel 44. According to an exemplary embodiment, mold cavity 40 may be contoured to form the fiber panel into a shape having a relatively low curvature and to form the resin into a resin element 94 having a high curvature. Because the curvature of the fiber panel may be limited due to the rigidity of the fibers, forming trim component 66 in this manner facilitates formation of high curvatures regions, while maintaining a desired structural rigidity. Gap 52 in fiber panel 44 may be intentionally positioned within a high curvature region and/or unintentionally formed by fiber tearing within the high curvature region.

FIG. 10 is a schematic cross-sectional view of an embodiment of a vehicle trim component manufactured by concurrent compression forming and injection molding comprising a lap joint between a resin component and a fiber panel. According to an exemplary embodiment, a resin component 96 overlaps a portion of fiber panel 44, forming a lap joint 98. By increasing the contact area between resin component 96 and fiber panel 44, the structural integrity of the interface may be enhanced. An extent of the overlap may be particularly configured to establish the desired bonding strength between resin component 96 and fiber panel 44. Fiber panel 44 may overlap a portion of resin component 96.

Figure 11:
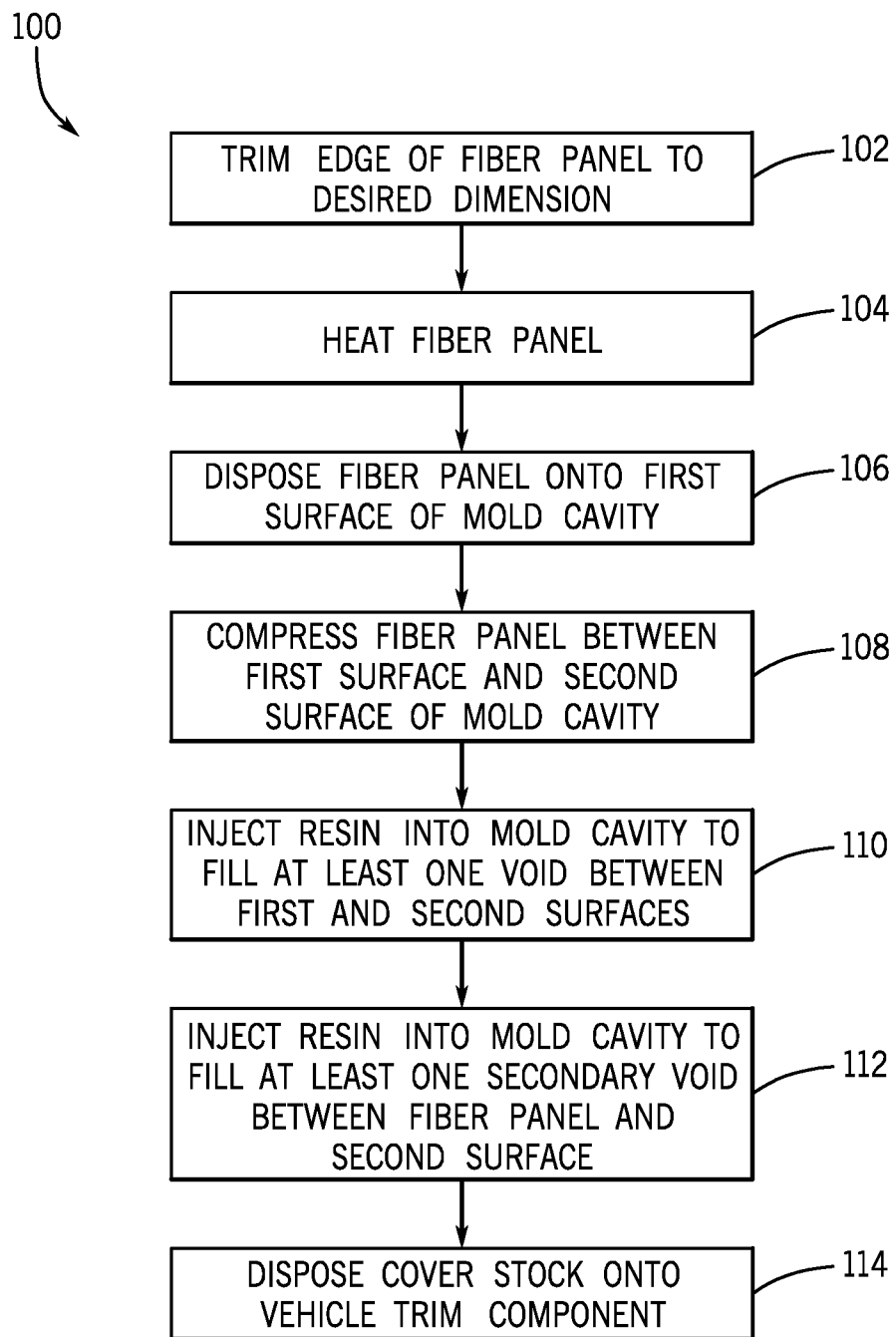
FIG. 11 is a flow diagram of an exemplary method of manufacturing a vehicle trim component via concurrent compression forming and injection molding.

FIG. 11 is a schematic flow diagram of an exemplary method 100 of manufacturing a vehicle trim component via concurrent compression forming and injection molding according to an exemplary embodiment. First, as represented by block 102, at least one edge of a fiber panel is trimmed to a desired dimension. Trimming the fiber panel prior to the compression forming process facilitates recycling of the offal, reducing waste that may otherwise be deposited in a landfill. Once the fiber panel is trimmed, the panel is heated, as represented by block 104. If the fiber panel includes thermoplastic resin, heating the panel will liquefy the resin, thereby facilitating compression forming of the panel. If the fiber panel includes a thermoset resin, the step of heating the fiber panel prior to placing the panel into the mold cavity may be obviated.

The fiber panel is then disposed onto a first surface of a mold cavity, as represented by block 106. Next, the fiber panel is compressed between the first surface and a second surface of the mold cavity to form the fiber panel into a desired shape, as represented by block 108. Resin is then injected into the mold cavity to fill at least one void between the first surface and the second surface adjacent to the fiber panel, as represented by block 110. The resin may fill a void extending about a portion of the periphery of the fiber panel to form a border. The resin may fill a void corresponding to a gap within the fiber panel, providing a substantially continuous structure. According to an exemplary embodiment, the resin is injected into the mold cavity to fill at least one secondary void between the fiber panel and the second surface, as represented by block 112. The secondary void may be shaped to form an ancillary component, such as a supporting rib or a connector. Steps 110 and 112 may be performed at the same time by injecting resin into a port that is fluidly coupled to the primary and secondary voids. After the interior trim component is removed from the mold cavity, a cover stock may be disposed onto the vehicle trim component, as represented by block 114.

According to an exemplary embodiment, fiber panel 44 and/or various resin components may be configured to provide a desirable show surface for trim component 66. In such embodiments, cover stock 86 may be obviated, reducing manufacturing costs. While a single fiber panel 44 is described above, the mold cavity may be configured to receive multiple fiber panels, and to compression mold the fiber panels into a desired trim component 66. According to an exemplary embodiment, multiple resins (e.g., shots of resin) may be injected into the mold cavity to form resin components having varying aesthetic and/or structural properties. Glass-filled resin may be injected into regions where additional structural support is desired, and pure resin may be injected into regions which form a portion of the show surface. Harder and/or softer resins may be injected into various regions to provide the desired texture/structural properties.

According to an exemplary embodiment, resin may be injected through a first fluid pathway extending to the first surface of the mold cavity and through a second fluid pathway extending to the second surface of the mold cavity. A portion of each side of the fiber panel may be coated with a layer of resin. According to an exemplary embodiment, resin may be injected through a fluid pathway extending through one surface of the mold cavity. The resin may then flow through a gap in the fiber panel, thereby enabling the resin to coat at least a portion of each side of the fiber panel. The pressure of the injected resin may induce the formation of a gap that facilitates resin flow through fiber panel 44.

According to an exemplary embodiment, certain components of an airbag assembly may be formed by the concurrent compression forming/injection molding process. According to an exemplary embodiment, an airbag door may comprise a first half formed by a compression formed fiber panel and a second half formed by an injection molded resin. The airbag door may be configured to separate along the interface between the fiber panel and the resin component. The mold cavity may comprise a void configured to form an injection molded airbag chute adjacent to the airbag door. Additional components, such as hinges, reinforcement elements and/or tethers, may be placed into the mold cavity prior to the compression forming/injection molding process. Such components may be integrated into the airbag door as the fiber panel is compressed and/or the resin is injected.

According to an exemplary embodiment, trim component 66 may comprise structurally weakened and/or strengthened regions to provide a desired rigidity and/or to absorb energy associated with an impact. For example, fiber panel 44 may comprise scores, seams and/or perforations to enable fiber panel 44 to collapse during an impact, thereby absorbing a portion of the impact energy. Resin ribs coupled to the fiber panel may be arranged (e.g., oriented perpendicular to a desired collapse direction) to facilitate a desired degree of energy absorption. According to an exemplary embodiment, the scores, seams and/or perforations may be filled with resin to provide a desirable show surface, while enabling the trim component to collapse during an impact.

Retractable Pin Assembly for Securing Fiber Panel to Mold

According to an exemplary embodiment, certain mold assemblies may comprise a first mold element configured to receive a fiber panel, and multiple pins configured to penetrate the fiber panel to secure the fiber panel to the first mold element. The pins hold the fiber panel in a desired position and/or orientation, enabling a second mold element to compress the fiber panel against the first mold element to form a component of a desired shape. The pins may leave irregular voids in the fiber panel, establishing a component having an uneven texture. The second mold element may comprise recesses configured to accommodate the pins extending from the first mold element. Forming the recesses within the second mold element may increase the cost and complexity of the mold assembly.

According to an exemplary embodiment, the mold assembly may comprise a retractable pin assembly configured to retract holding pins prior to or during compression of the fiber panel, enabling resin to fill voids formed by the holding pins. The component may have a substantially smooth texture. According to an exemplary embodiment, a mold assembly for manufacturing a vehicle trim component may comprise a first mold element configured to receive a fiber panel. The mold assembly may comprise a retractable pin assembly having multiple holding pins configured to penetrate the fiber panel to secure the fiber panel to the first mold element. The mold assembly may comprise a second mold element configured to compress the fiber panel between a first surface of the first mold element and a second surface of the second mold element to form the fiber panel into a desired shape. The retractable pin assembly may be configured to withdraw the holding pins from the fiber panel prior to or during compression of the fiber panel between the first and second surfaces. The mold assembly may comprise fluid pathways configured to inject resin into voids in the fiber panel formed by the holding pins. A substantially smooth component may be formed when the resin cures and hardens.

Figure 12:
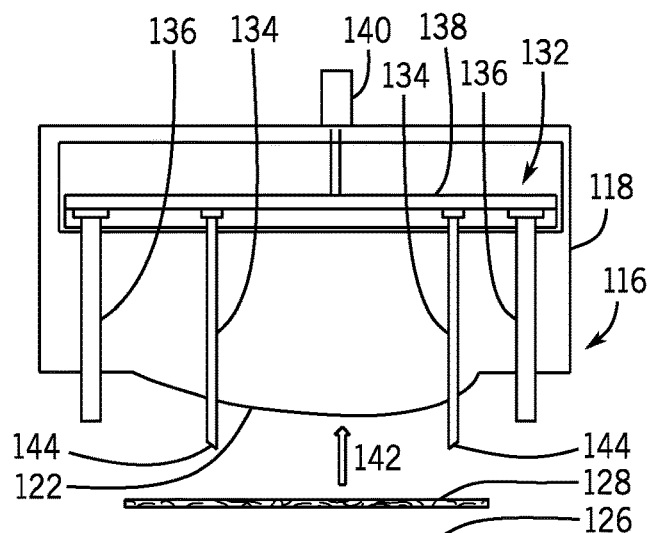
FIG. 12 is a schematic diagram of an embodiment of a mold assembly having a retractable pin assembly configured to secure a fiber panel within a mold cavity.

FIG. 12 is a schematic diagram of an embodiment of a mold assembly 116 having a retractable pin assembly configured to secure a fiber panel within a mold cavity. According to an exemplary embodiment, mold assembly 116 may comprise a first (e.g., upper) mold element 118 and a second (e.g., lower) mold element 120. As illustrated, first mold element 118 may comprise a first surface 122 defining a first portion of a mold cavity 124, and second mold element 120 may comprise a second surface 126 defining a second portion of mold cavity 124. First surface 122 may be configured to receive a fiber panel 128, and second surface 126 may be configured to compress fiber panel 128 against first surface 122 to form fiber panel 128 into a desired shape.

According to an exemplary embodiment, fiber panel 128 may comprise a combination of structural fibers and thermoplastic resin. The structural fibers may comprise natural fibers, such as hemp, wood, flax, kenaf and sisal, and/or synthetic fibers, such as glass fibers, carbon fibers and polymeric fibers. The thermoplastic resin may comprise polypropylene (PP), acrylonitrile butadiene styrene (ABS) and/or polycarbonate (PC) binders, for example. Fiber panel 128 may be constructed from about 50 percent natural fibers and about 50 percent PP. To facilitate compression forming, fiber panel 128 is heated (e.g., to about 200 degrees Celsius) to induce the thermoplastic resin to liquefy. Fiber panel 128 is then disposed onto first surface 122 of cavity 124, and compressed between first surface 122 and second surface 126 as second mold element 120 is driven toward first mold element 118 along direction 130. As fiber panel 128 cools within mold assembly 116, the thermoplastic solidifies, thereby establishing a substantially rigid composite panel that conforms to the shape of mold cavity 124.

According to an exemplary embodiment, fiber panel 128 may comprise a combination of structural fibers and a thermoset resin. The structural fibers may comprise natural fibers, such as hemp, wood, flax, kenaf and sisal, and/or synthetic fibers, such as glass fibers, carbon fibers and polymeric fibers. The thermoset resin may comprise epoxy resin, polyimide resin, polyester resin and/or vinylester resin. Fiber panel 128 may be constructed from Fibrowood, which is manufactured by Johnson Controls Technology Company of Holland, Mich. To facilitate compression forming, fiber panel 128 is disposed onto first surface 122 of cavity 124 and compressed between first surface 122 and second surface 126 as second mold element 120 is driven toward first mold element 118 along direction 130. During the compression process, panel 128 is heated (e.g., via a heated mold assembly 116), inducing the thermoset resin to cure. A substantially rigid composite panel that conforms to the shape of mold cavity 124 is formed.

According to an exemplary embodiment, mold assembly 116 may comprise a retractable pin assembly 132 configured to hold fiber panel 128 in a desired position until second mold element 120 is proximate to first mold element 118. Retractable pin assembly 132 may comprise multiple holding pins 134 configured to penetrate fiber panel 128 to secure fiber panel 128 to first mold element 118. While the illustrated embodiment may comprise two holding pins 134, alternative embodiments may comprise more or fewer holding pins 134. Certain embodiments may comprise one, two, three, four, six, eight, ten, twelve or more holding pins 134.

According to an exemplary embodiment, retractable pin assembly 132 may be configured to withdraw the holding pins from fiber panel 128 prior to or during compression of the fiber panel between first surface 122 and second surface 126. Retractable pin assembly 132 may retract holding pins 134 when the first and second surfaces are sufficiently close to substantially block movement of fiber panel 128 within mold cavity 124. Because holding pins 134 are withdrawn from fiber panel 128 prior to or during the compression forming process, resin may be injected into voids formed by holding pins 134, establishing a vehicle trim component having a substantially smooth surface. Because holding pins 134 retract instead of entering openings within second mold element 120, the cost and/or complexity of the second mold element may be reduced.

According to an exemplary embodiment, retractable pin assembly 132 may comprise return pins 136 configured to drive holding pins 134 to withdraw from fiber panel 128. Contact between return pins 136 and a surface of second mold element 120 drives a connecting plate 138 away from first surface 122. Connecting plate 138, in turn, drives holding pins 134 to retract. Holding pins 134 and return pins 136 are coupled to connecting plate 138 by a suitable connection, such as a welded connection, a mechanical interlock, or a fastener. While the illustrated embodiment may comprise two return pins 136, alternative embodiments may comprise more or fewer return pins 136. For example, certain embodiments may comprise one, two, three, four, six, eight, ten, twelve or more return pins.

Retractable pin assembly 132 may comprise an actuator 140 configured to extend holding pins 134 after the mold elements are separated from one another and the fiber panel is removed from the mold cavity. Actuator 140 may comprise a pneumatic cylinder configured to drive connecting plate 138 to an initial position that enables holding pins 134 to penetrate a subsequent fiber panel 128. Actuator 140 may comprise a hydraulic cylinder, an electromechanical drive unit, or a mechanical actuator.

To secure fiber panel 128 to first mold element 118, fiber panel 128 is moved in direction 142 such that a pointed end 144 of each holding pin 134 penetrates fiber panel 128. An operator may position fiber panel 128 at a desired position/orientation within mold cavity 124, and then move fiber panel 128 in direction 142 such that holding pins 134 penetrate the fiber panel. Contact between holding pins 134 and fiber panel 128 secures fiber panel 128 in the desired position/orientation.

Figure 13:
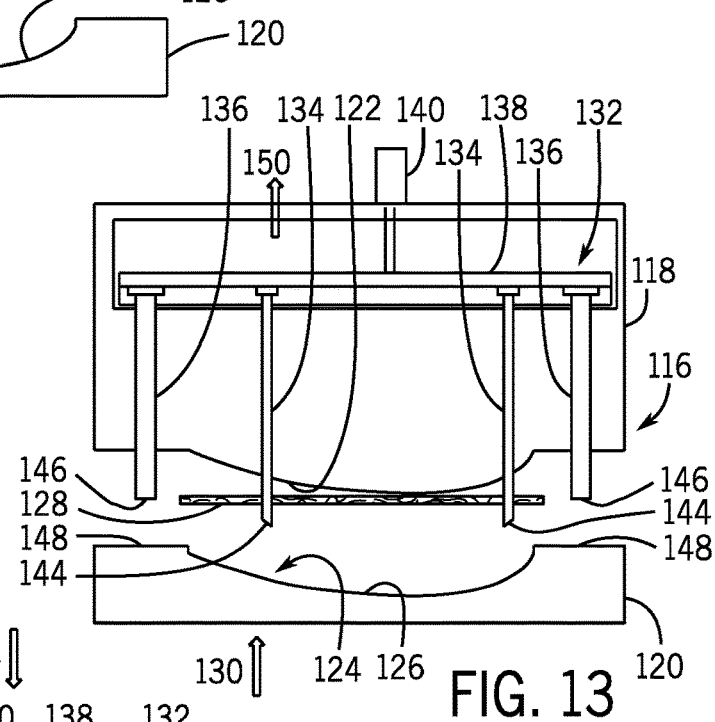
FIG. 13 is a schematic diagram of the mold assembly of FIG. 12, in which the fiber panel is secured to a mold element of the mold assembly via holding pins.

FIG. 13 is a schematic diagram of mold assembly 116 of FIG. 12, in which fiber panel 128 is secured to first mold element 118 via holding pins 134. According to an exemplary embodiment, holding pins 134 may be configured to secure fiber panel 128 in a desired position/orientation until the first and second surfaces are sufficiently close to substantially block movement of fiber panel 128 within mold cavity 124. Once fiber panel 128 is secured to first mold element 118, second mold element 120 is driven in direction 130. When second mold element 120 is proximate to first mold element 118, a distal end 146 of each return pin 136 contacts a bearing surface 148 of second mold element 120. As second mold element 120 continues to move in direction 130, contact between bearing surface 148 and distal end 146 of each return pin 136 drives connecting plate 138 in direction 150. Holding pins 134 are driven in direction 150, withdrawing holding pins 134 from fiber panel 128. Because holding pins 134 are withdrawn while the mold elements are proximate to one another, movement of fiber panel 128 is substantially blocked by first surface 122 and second surface 126.

According to an exemplary embodiment, the length of holding pins 134 and/or return pins 136 may be adjusted to control withdrawal of holding pins 134 from fiber panel 128. Longer holding pins 134 may secure fiber panel 128 to first mold element 118 until the mold elements are closer to one another. Shorter holding pins 134 may release fiber panel 128 from first mold element 118 while the mold elements are farther apart. Longer return pins 136 may induce holding pins 134 to withdraw from fiber panel 128 while the mold elements are farther apart, and shorter return pins 136 may induce holding pins 134 to secure fiber panel 128 to first mold element 118 until the mold elements are closer to one another. Controlling the withdrawal of holding pins 134 may facilitate accurate placement of the fiber panel within the mold cavity, and may control tension within the fiber panel prior to or during the compression forming process.

Figure 14:
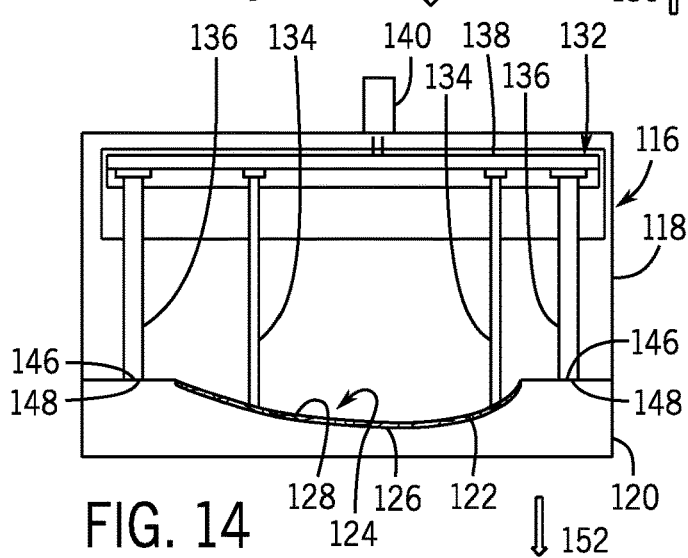
FIG. 14 is a schematic diagram of the mold assembly of FIG. 12, in which the holding pins are retracted.

FIG. 14 is a schematic diagram of the mold assembly of FIG. 12, in which holding pins 134 are retracted. According to an exemplary embodiment, contact between distal end 146 of each return pin 136 and bearing surface 148 of the second mold element drives return pins 136 in direction 150. Connecting plate 138, which is coupled to return pins 136, drives holding pins 134 in direction 150, withdrawing holding pins 134 from the fiber panel. Holding pins 134 are withdrawn from fiber panel 128, and fiber panel 128 is compressed between first surface 122 of first mold element 118 and second surface 126 of second mold element 120.

According to an exemplary embodiment, after the fiber panel is compression formed into the desired shape, second mold element 120 is driven in a direction 152 away from first mold element 118. Fiber panel 128 is then removed from mold cavity 124 (e.g., via an ejection system). Actuator 140 drives connecting plate 138 in direction 154, transitioning holding pins 134 and return pins 136 to an extended position. With holding pins 134 in the extended position, a subsequent fiber panel 128 may be secured to first mold element 118 via penetration of holding pins 134 into fiber panel 128.

While the embodiment described above employs an actuator to extend holding pins 134 after fiber panel 128 is removed from mold cavity 124, other actuating assemblies may be employed in alternative embodiments. According to an exemplary embodiment, a mechanical linkage between the second mold element and the holding pins may drive the holding pins to extend as the second mold element moves away from the first mold element. According to an exemplary embodiment, a spring may urge the holding pins to extend upon movement of the second mold element away from the first mold element. The distal end of each return pin may be magnetically coupled to the bearing surface of the second mold element. Movement of the second mold element away from the first mold element drives the return pins and the holding pins to the extended position. Further movement of the second mold element away from the first mold element overcomes the magnetic coupling between the return pins and the second mold element, thereby enabling the second mold element to continue movement away from the first mold element. The mold assembly may comprise ejector pins to facilitate extraction of the fiber panel from the mold cavity. Movement of the ejector pins may drive the connecting plate in direction 154, transitioning holding pins 134 to the extended position.

While the embodiment described above employs return pins 136 and a connecting plate 138 to drive holding pins 134 to retract, other actuating assemblies may be employed in alternative embodiments. According to an exemplary embodiment, an actuator (e.g., hydraulic cylinder, pneumatic cylinder, electromechanical actuator, etc.) may be utilized to transition the holding pins between the extended and retracted positions. A sensor may be employed to determine a position of the second mold element relative to the first mold element. A controller communicatively coupled to the sensor may then control the position of the holding pins based on the detected position of the second mold element. The controller may instruct the holding pins to retract when the second mold element is proximate to the first mold element. The controller may instruct the holding pins to extend as the second mold element moves away from the first mold element.

Figure 15:
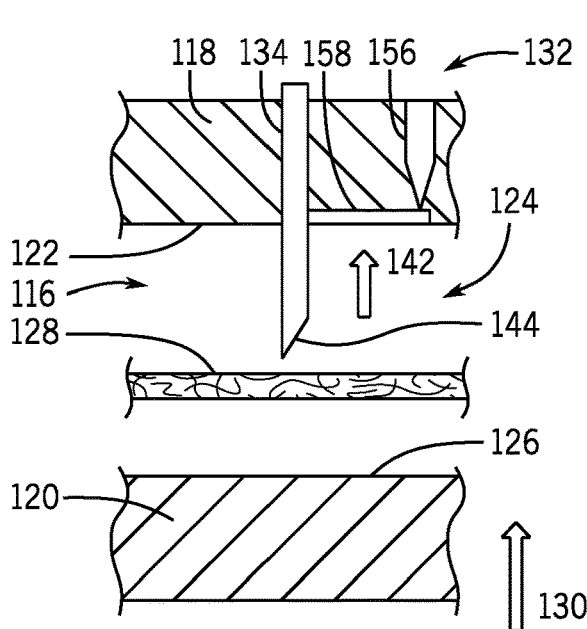
FIG. 15 is a schematic diagram of an embodiment of a mold assembly having a fluid pathway configured to inject resin into a void formed by a holding pin.

FIG. 15 is a schematic diagram of an embodiment of a mold assembly 116 having a fluid pathway configured to inject resin into a void formed by a holding pin. According to an exemplary embodiment, fiber panel 128 may be secured to first mold element 118 by moving fiber panel 128 in direction 142 such that pointed end 144 of holding pin 134 penetrates fiber panel 128. Second mold element 120 is driven in direction 130, inducing retractable pin assembly 132 to withdraw holding pin 134 from fiber panel 128. Holding pin 134 may establish a void in fiber panel 128.

Mold assembly 116 may be configured to flow resin into the void, enhancing the smoothness of the vehicle trim component.

According to an exemplary embodiment, first mold element 118 may comprise a resin manifold 156 and a fluid pathway 158 extending from resin manifold 156 to retractable pin 134. Resin manifold 156 and fluid pathway 158 may be configured to provide resin to the void formed by holding pin 134. As a result, the void may be filled with resin, thereby establishing a vehicle trim component having a substantially smooth texture.

Figure 16:
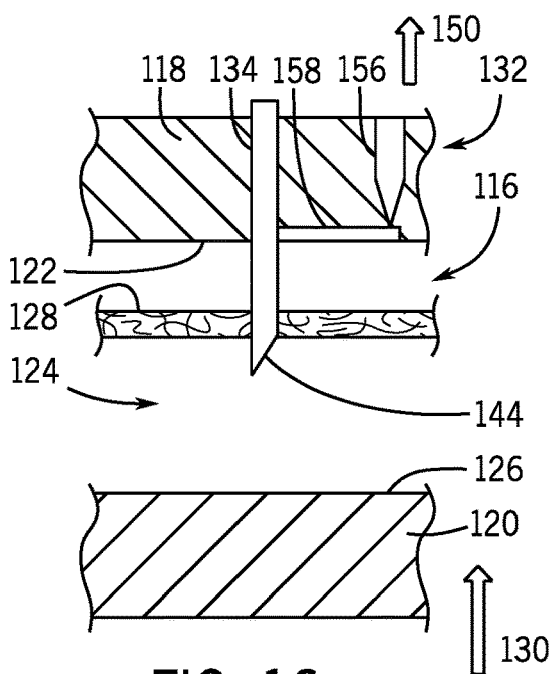
FIG. 16 is a schematic diagram of the mold assembly of FIG. 15, in which a fiber panel is secured to a mold element of the mold assembly via a holding pin.

FIG. 16 is a schematic diagram of mold assembly 116 of FIG. 15, in which fiber panel 128 is secured to first mold element 118 via a holding pin 134. According to an exemplary embodiment, holding pin 134 displaces material as holding pin 134 penetrates fiber panel 128 and a void is formed within fiber panel 128. The void may be filled with resin to establish a vehicle trim component having a substantially smooth texture.

Figure 17:
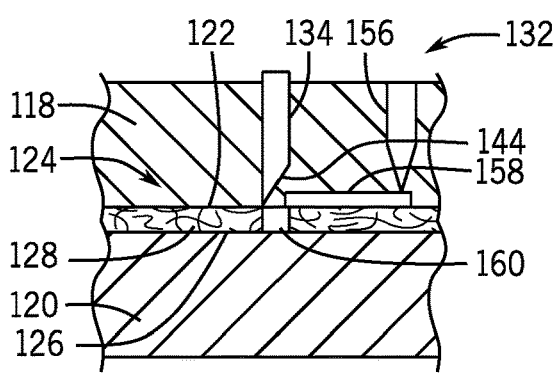
FIG. 17 is a schematic diagram of the mold assembly of FIG. 15, in which the holding pin is retracted.

FIG. 17 is a schematic diagram of mold assembly 116 of FIG. 15, in which holding pin 134 is retracted. According to an exemplary embodiment, withdrawing holding pin 134 from fiber panel 128 forms a void 160. Fluid pathway 158 is positioned to flow resin from resin manifold 156 into void 160. Resin may be injected through manifold 156 and fluid pathway 158 to substantially fill void 160, enhancing the smoothness of the vehicle trim component.

Figure 18:
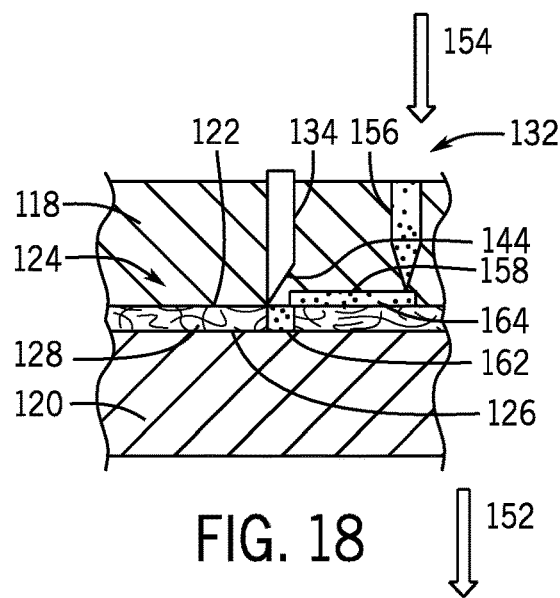
FIG. 18 is a schematic diagram of the mold assembly of FIG. 15, in which resin is injected into the void formed by the holding pin.

FIG. 18 is a schematic diagram of mold assembly 116 of FIG. 15, in which resin is injected into void 160 formed by holding pin 134. According to an exemplary embodiment, the resin substantially fills void 160, forming a resin feature 162 that establishes a vehicle trim component having a substantially smooth texture. The resin substantially fills fluid pathway 158, establishing a runner or ridge 164 on the rear surface of the vehicle trim component. Each void within the fiber panel may be filled in a similar manner. Because the voids formed by the holding pins are filled with resin, the holding pins may be positioned to provide enhanced coupling between the fiber panel and the first mold element without degrading the smoothness of the vehicle trim component.

Figure 19:
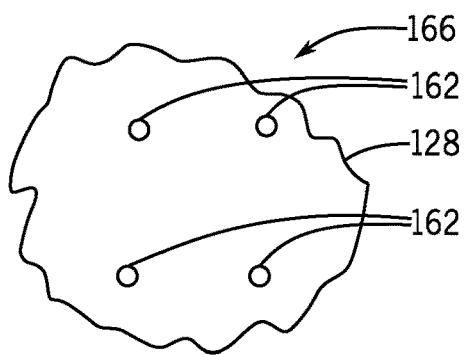
FIG. 19 is a schematic top view of an embodiment of a vehicle trim component formed within a mold cavity having a retractable pin assembly.

FIG. 19 is a top view of an embodiment of a vehicle trim component 166 formed within a mold cavity having a retractable pin assembly. According to an exemplary embodiment, each void within fiber panel 128 is filled with a resin feature 162, establishing vehicle trim component 166 having a substantially smooth surface. A coverstock may be disposed on a surface of the fiber panel to form a desirable show surface. Because the voids in the fiber panel are filled with resin, the coverstock may appear substantially smooth, enhancing the visual appeal of the vehicle interior.

Figure 20:
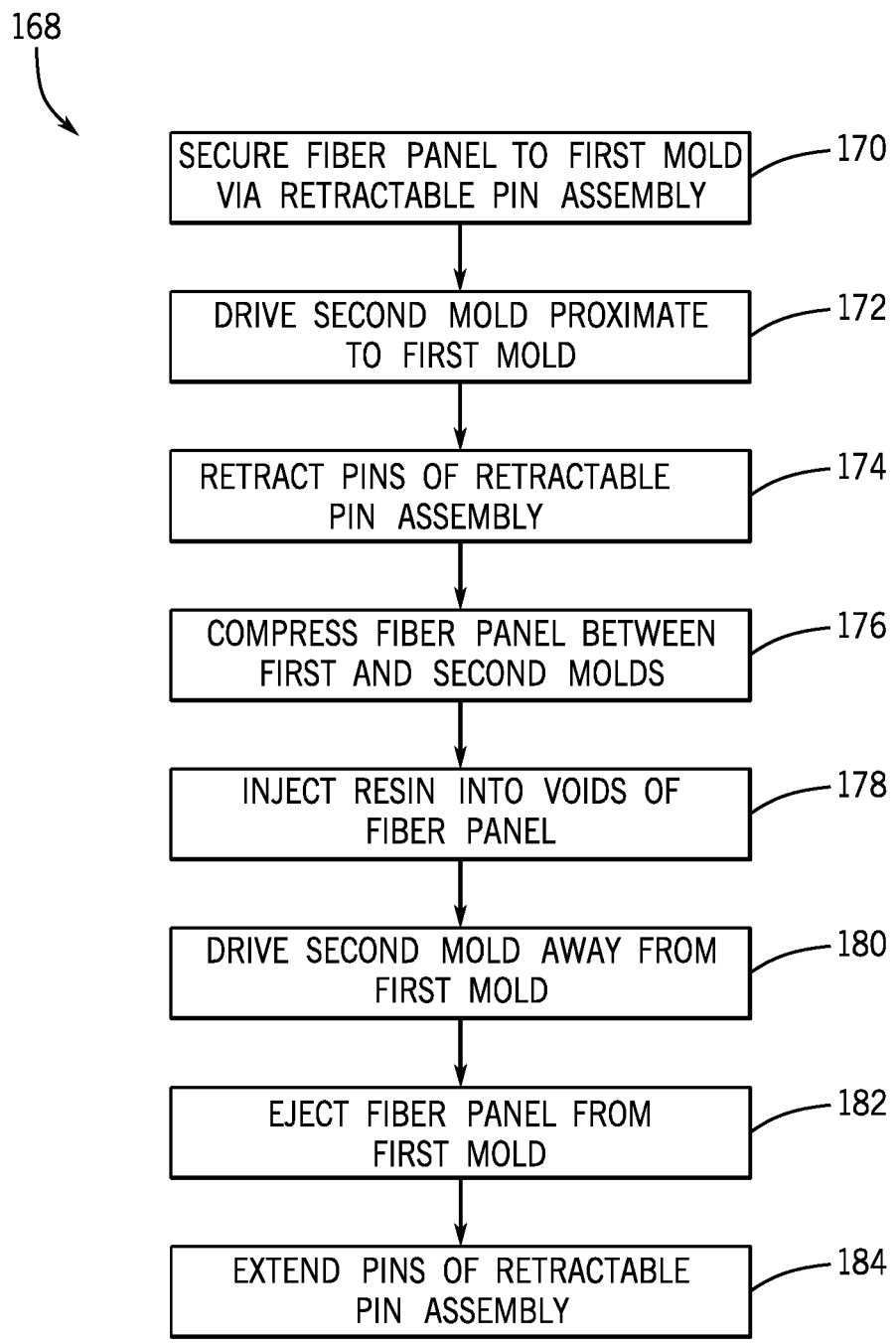
FIG. 20 is a flow diagram of an embodiment of a method for forming a vehicle trim component within a mold assembly having a retractable pin assembly.

FIG. 20 is a flow diagram of an embodiment of a method 168 for forming a vehicle trim component within a mold assembly having a retractable pin assembly. According to an exemplary embodiment, as represented by block 170, a fiber panel is secured to a first mold element via a retractable pin assembly. The retractable pin assembly may comprise multiple holding pins configured to penetrate the fiber panel to secure the fiber panel to the first mold element. Next, as represented by block 172, the second mold element is driven toward the first mold element. When the second mold element is proximate to the first mold element, the holding pins of the retractable pin assembly are retracted, as represented by block 174. The retractable pin assembly may comprise multiple return pins configured to drive the holding pins to withdraw from the fiber panel via contact between the return pins and the second mold element. The fiber panel is compressed between the first mold element and the second mold element, as represented by block 176. Compressing the fiber panel between the mold elements forms the fiber panel into a desired shape. According to an exemplary embodiment, the holding pins are retracted (e.g., withdrawn from the fiber panel) as the fiber panel is compressed between the first mold element and the second mold element. Resin is then injected into voids in the fiber panel formed by the holding pins, as represented by block 178. Filling the voids may establish a vehicle interior component having a substantially smooth surface, thereby enhancing the appearance of the vehicle interior.

After the compression forming/injection molding process is complete, the second mold element is driven away from the first mold element, as represented by block 180. The fiber panel is then ejected from the first mold element (e.g., via ejection pins), as represented by block 182. Next, as represented by block 184, the holding pins of the retractable pin assembly are extended. The retractable pin assembly may comprise an actuator configured to drive the holding pins toward an extended position, enabling the holding pins to penetrate a subsequent fiber panel.

Resin Feature for Supporting a Bent Edge of a Fiber Panel

According to an exemplary embodiment, a mold assembly may comprise a first mold element and a second mold element configured to be brought together to compress a fiber panel into a desired shape. Such mold assemblies may comprise a trim blade configured to penetrate the fiber panel as the first and second mold elements are brought together to trim the fiber panel to desired dimensions. Using an in-mold trim blade to shape the fiber panel may weaken the edges of the panel, reducing longevity.

According to an exemplary embodiment, a mold assembly may be configured to inject resin onto adjacent inner surfaces of a bent edge of the fiber panel, enhancing the strength of the edge. According to an exemplary embodiment, a mold assembly for manufacturing a vehicle trim component may comprise a first mold element configured to receive a fiber panel. The mold assembly may comprise a second mold element configured to compress the fiber panel between a first surface of the first mold element and a second surface of the second mold element to form the fiber panel into a desired shape. The mold assembly may comprise a fluid pathway configured to inject resin onto adjacent inner surfaces of a bent edge of the fiber panel such that the resin extends to a distal end of the bent edge. Injecting the resin onto the inner surfaces of the bent edge establishes a resin feature that supports the bent edge, enhancing the strength and increasing the longevity of the fiber panel.

Figure 21:
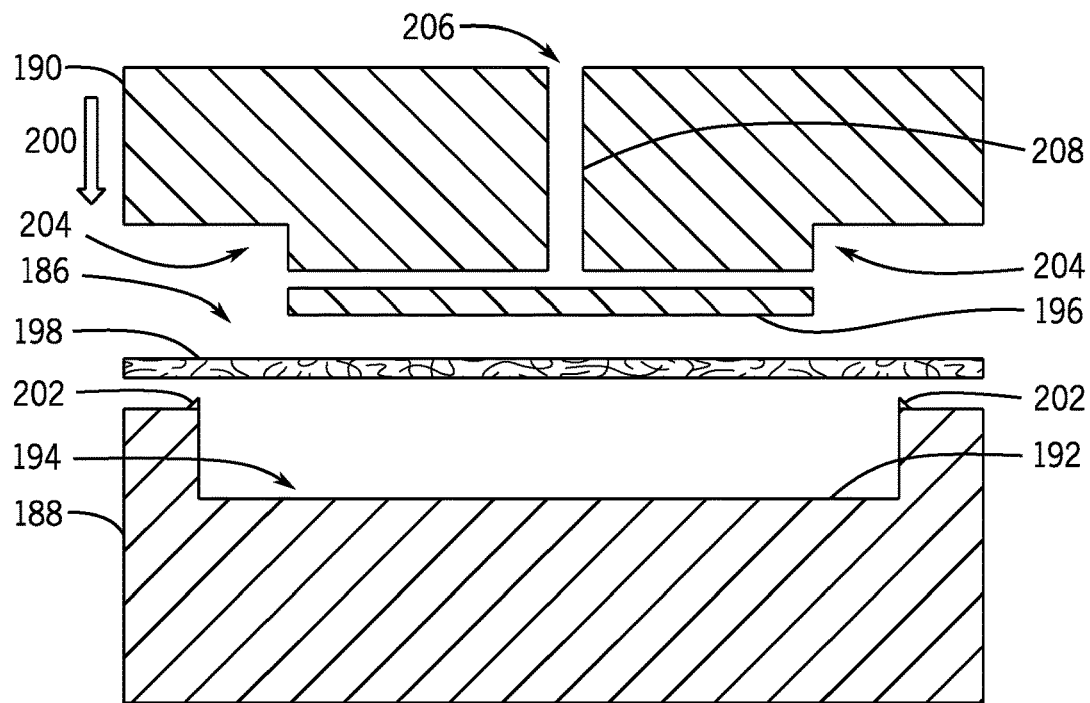
FIG. 21 is a schematic diagram of an embodiment of a mold assembly having a fluid pathway configured to inject resin onto adjacent inner surfaces of a bent edge of a fiber panel.

FIG. 21 is a schematic diagram of an embodiment of a mold assembly 186 having a fluid pathway configured to inject resin onto adjacent inner surfaces of a bent edge of a fiber panel. According to an exemplary embodiment, mold assembly 186 may comprise a first (e.g., lower) mold element 188 and a second (e.g., upper) mold element 190. As illustrated, first mold element 188 may comprise a first surface 192 defining a first portion of a mold cavity 194, and second mold element 190 may comprise a second surface 196 defining a second portion of mold cavity 194. First surface 192 may be configured to receive a fiber panel 198, and second surface 196 may be configured to compress fiber panel 198 against first surface 192 to form fiber panel 198 into a desired shape.

According to an exemplary embodiment, fiber panel 198 may comprise a combination of structural fibers and thermoplastic resin. The structural fibers may comprise natural fibers, such as hemp, wood, flax, kenaf and sisal, and/or synthetic fibers, such as glass fibers, carbon fibers and polymeric fibers. The thermoplastic resin may comprise polypropylene (PP), acrylonitrile butadiene styrene (ABS) and/or polycarbonate (PC) binders. Fiber panel 198 may be constructed from about 50 percent natural fibers and about 50 percent PP. To facilitate compression forming, fiber panel 198 is heated (e.g., to about 200 degrees Celsius) to induce the thermoplastic resin to liquefy. Fiber panel 198 is disposed onto first surface 192 of cavity 194, and compressed between first surface 192 and second surface 196 as second mold element 190 is driven toward first mold element 188 along direction 200. As fiber panel 198 cools within mold assembly 186, the thermoplastic solidifies, establishing a substantially rigid composite panel that conforms to the shape of mold cavity 194.

According to an exemplary embodiment, fiber panel 198 may comprise a combination of structural fibers and a thermoset resin. The structural fibers may comprise natural fibers, such as hemp, wood, flax, kenaf and sisal, and/or synthetic fibers, such as glass fibers, carbon fibers and polymeric fibers. The thermoset resin may comprise epoxy resin, polyimide resin, polyester resin and/or vinylester resin. Fiber panel 198 may be constructed from Fibrowood, which is manufactured by Johnson Controls Technology Company of Holland, Mich. To facilitate compression forming, fiber panel 198 is disposed onto first surface 192 of cavity 194 and compressed between first surface 192 and second surface 196 as second mold element 190 is driven toward first mold element 188 along direction 200. During the compression process, panel 198 is heated (e.g., via a heated mold assembly 186), inducing the thermoset resin to cure. A substantially rigid composite panel that conforms to the shape of mold cavity 194 is formed.

According to an exemplary embodiment, first mold element 188 may comprise trim blades 202 configured to trim fiber panel 198 to desired dimensions as fiber panel 198 is compressed within mold cavity 194. As second mold element 190 is driven in direction 200, contact between second mold element 190 and fiber panel 198 drives edges of fiber panel 198 into contact with trim blades 202. Further movement of second mold element 190 in direction 200 induces trim blades 202 to penetrate fiber panel 198, trimming fiber panel 198 to the desired dimensions. While two trim blades 202 are employed in the illustrated embodiment, alternative embodiments may comprise more or fewer trim blades 202 (e.g., one, two, three, four, five, six or more). While trim blades 202 are coupled to first mold element 188 in the illustrated embodiment, at least a portion of trim blades 202 may be coupled to second mold element 190 in alternative embodiments.

The process of trimming fiber panel 198 with trim blades 202 may weaken the edges of fiber panel 198. According to an exemplary embodiment, mold assembly 186 may be configured to inject resin onto adjacent inner surfaces of a bent edge of fiber panel 198, thereby enhancing the strength of the edge. Second mold element 190 may comprise a recess 204 configured to establish a void within mold cavity 194 when mold assembly 186 is closed. When mold assembly 186 is closed, the void is positioned proximate to adjacent inner surfaces of a bent edge of fiber panel 198. The second mold element may comprise an inlet 206 and a fluid pathway 208 extending from inlet 206 to the void. Fluid pathway 208 may be configured to inject the resin into the void such that the resin flows onto adjacent inner surfaces of a bent edge of the fiber panel.

Figure 22:
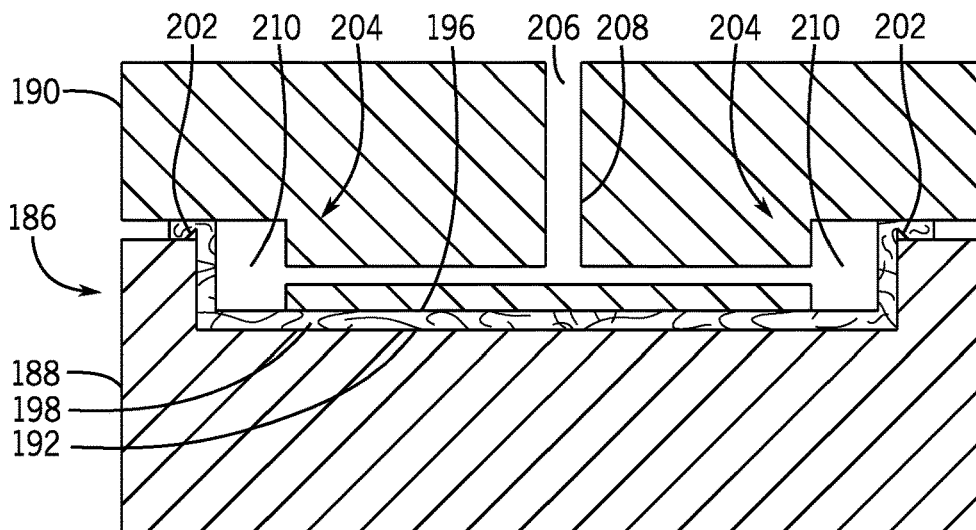
FIG. 22 is a schematic diagram of the mold assembly of FIG. 21 in a closed position.

FIG. 22 is a schematic diagram of mold assembly 186 of FIG. 21 in a closed position. According to an exemplary embodiment, with the mold assembly in the closed position, trim blade 202 penetrates fiber panel 198, thereby trimming the fiber panel to the desired dimensions. Recess 204 establishes a void 210 positioned proximate to adjacent inner surfaces of a bent edge of fiber panel 198. When resin is injected into void 210 (e.g., via inlet 206 and fluid pathway 208), the resin flows onto the adjacent inner surfaces of the bent edge. Because the void extends to a distal end of the bent edge, the resin flows to the lateral extent of fiber panel 198 (e.g., where trim blade 202 cuts fiber panel 198). Once the resin cures and hardens, a resin feature is formed that supports the bent edge of the fiber panel, enhancing the strength and increasing the longevity of the vehicle trim component. void 210 may extend about the entire periphery of fiber panel 198. According to an exemplary embodiment, void 210 may extend about a portion of the periphery.

Figure 23:
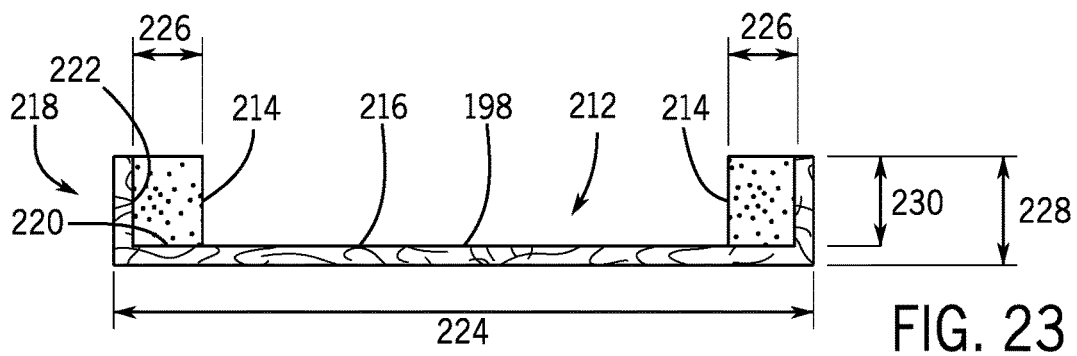
FIG. 23 is a schematic cross-sectional view of an embodiment of a vehicle trim component having a resin feature configured to support a bent edge of a fiber panel.

FIG. 23 is a schematic cross-sectional view of an embodiment of a vehicle trim component 212 having a resin feature 214 configured to support a bent edge of fiber panel 198. According to an exemplary embodiment, resin feature 214 is injection-molded (e.g., via mold assembly 186 comprising void 210) onto an inner surface 216 of fiber panel 198. When trim component 212 is installed within a vehicle, inner surface 216 faces away from the vehicle interior. In this configuration, resin feature 214 supports bent edge 218 of fiber panel 198 while providing a substantially smooth show surface (e.g., the surface opposite inner surface 216).

According to an exemplary embodiment, resin feature 214 extends between a first inner surface 220 of bent edge 218 and a second inner surface 222 of bent edge 218. Resin feature 214 extends to a distal end of bent edge 218. Resin feature 214 supports bent edge 218, enhancing the strength of fiber panel 198 and increasing the longevity of vehicle trim component 212. A length 224 of fiber panel 198 may be selected based on a desired application. A length 226 of resin feature 214 may be selected to provide desired support to bent edge 218 of fiber panel 198. For example, if vehicle trim component 212 is employed within a door panel, resin feature 214 may have a longer length 226 to accommodate expected loads (e.g., from an occupant pulling on bent edge 218 to close a vehicle door, from service personnel prying bent edge 218 away from the door to remove the door panel, etc.). A height 228 of bent edge 218 and a height 230 of resin feature 214 may be selected to provide desired support to bent edge 218. Longer heights 228 and 230 may enhance the strength of the edge, thereby enabling vehicle trim component 212 to accommodate higher loads.

According to an exemplary embodiment, resin feature 214 may extend about the entire periphery of vehicle trim component 212. However, alternative embodiments may comprise a resin feature 214 that extends about a portion of the periphery. While an angle between inner surfaces 220 and 222 of bent edge 218 is about 90 degrees in the illustrated embodiment, alternative embodiments may comprise a larger or smaller angle between the inner surfaces. The bent edge may be curved, or may comprise multiple angled sections.

Figure 24:
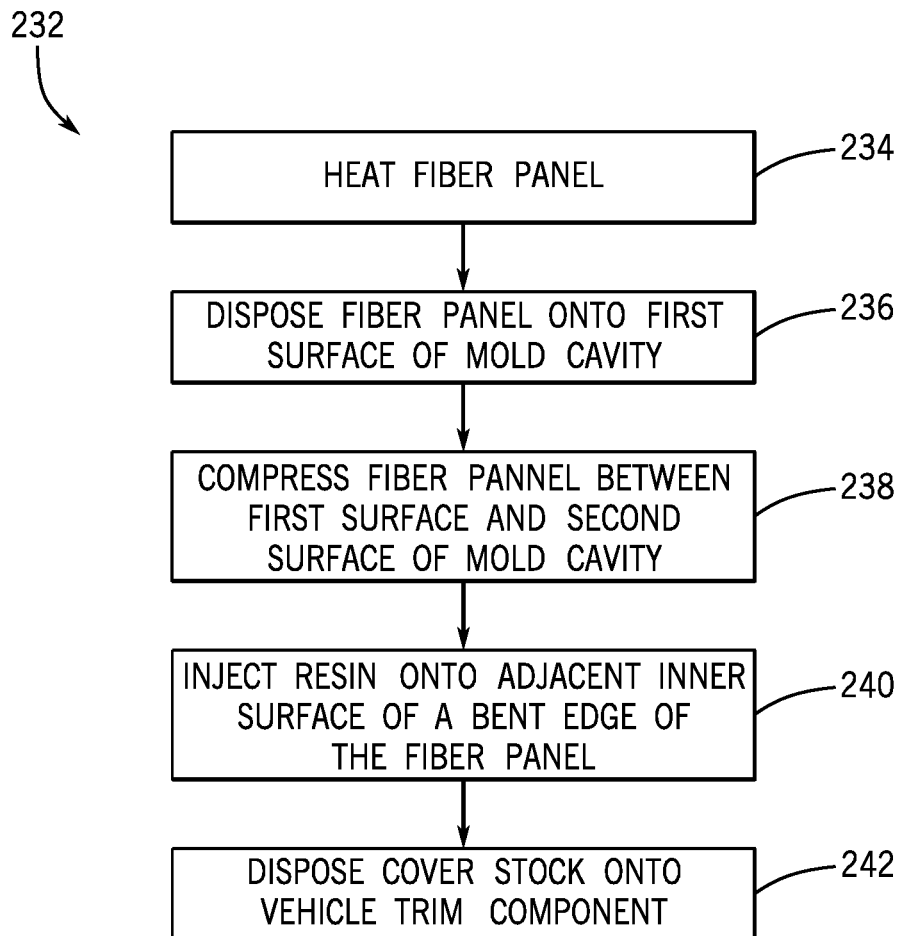
FIG. 24 is a flow diagram of an embodiment of a method for forming a vehicle trim component by injecting resin onto adjacent inner surfaces of a bent edge of a fiber panel.

FIG. 24 is a flow diagram of an embodiment of a method 232 for forming a vehicle trim component by injecting resin onto adjacent inner surfaces of a bent edge of a fiber panel. According to an exemplary embodiment, the fiber panel is heated, as represented by block 234. If the fiber panel includes thermoplastic resin, heating the panel liquefies the resin, facilitating compression forming of the panel. If the fiber panel includes a thermoset resin, the panel may be heated during the compression process. The fiber panel is disposed onto a first surface of a mold cavity, as represented by block 236. The fiber panel is compressed between the first surface and a second surface of the mold cavity to form the fiber panel into a desired shape, as represented by block 238.

Resin is injected onto adjacent inner surfaces of a bent edge of the fiber panel, as represented by block 240. The resin may be injected into a void positioned proximate to the adjacent inner surfaces of the bent edge. According to an exemplary embodiment, the void establishes a resin feature that supports the bent edge of the fiber panel, increasing the strength of the panel. After the interior trim component is removed from the mold cavity, a cover stock may be disposed onto the vehicle trim component, as represented by block 242. According to an exemplary embodiment, the fiber panel and/or various resin components may be particularly configured to provide a desirable show surface for the trim component and the cover stock may be obviated, reducing manufacturing costs.

Floating Core Assembly for Urging a Fiber Panel Against a Mold Surface

According to an exemplary embodiment, certain mold assemblies may comprise a first mold element and a second mold element configured to be brought together to compress a fiber panel into a desired shape. The second mold element may drive the fiber panel into contact with the first mold element. Further movement of the second mold element relative to the first mold element compresses the fiber panel into the desired shape. A trim blade may be coupled to the first mold element and configured to trim the fiber panel to desired dimensions as the first and second mold elements compress the fiber panel. As the second mold element drives the fiber panel into contact with the first mold element, the fiber panel may become caught on the trim blade. The trim blade may tear a portion of the fiber panel, weakening the fiber panel, and/or forming a vehicle trim component having an undesirable appearance/texture. While the fiber panel is caught on the trim blade, tension may build within the fiber panel as the second mold element continues to move toward the first mold element. Once the fiber panel is freed from the trim blade, the released tension may drive the fiber panel to shift within the mold assembly, shifting the fiber panel away from the desired position/orientation.

According to an exemplary embodiment, the mold assembly may comprise a floating core assembly configured to urge the fiber panel against a surface of a mold element before a trim blade penetrates the fiber panel. According to an exemplary embodiment, a mold assembly for manufacturing a vehicle trim component may comprise a first mold element and a second mold element configured to be brought together to compress a fiber panel into a desired shape. The mold assembly may comprise a trim blade configured to penetrate the fiber panel as the first and second mold elements are brought together to trim the fiber panel to desired dimensions. The mold assembly may comprise a floating core assembly coupled to the second mold element and configured to urge the fiber panel against a surface of the first mold element before the trim blade penetrates the fiber panel. Because the fiber panel is disposed against the surface of the first mold element before the trim blade penetrates the fiber panel, the possibility of the fiber panel being caught on the trim blade is substantially reduced or eliminated. The mold assembly may form a stronger and/or more aesthetically pleasing trim component.

Figure 25:
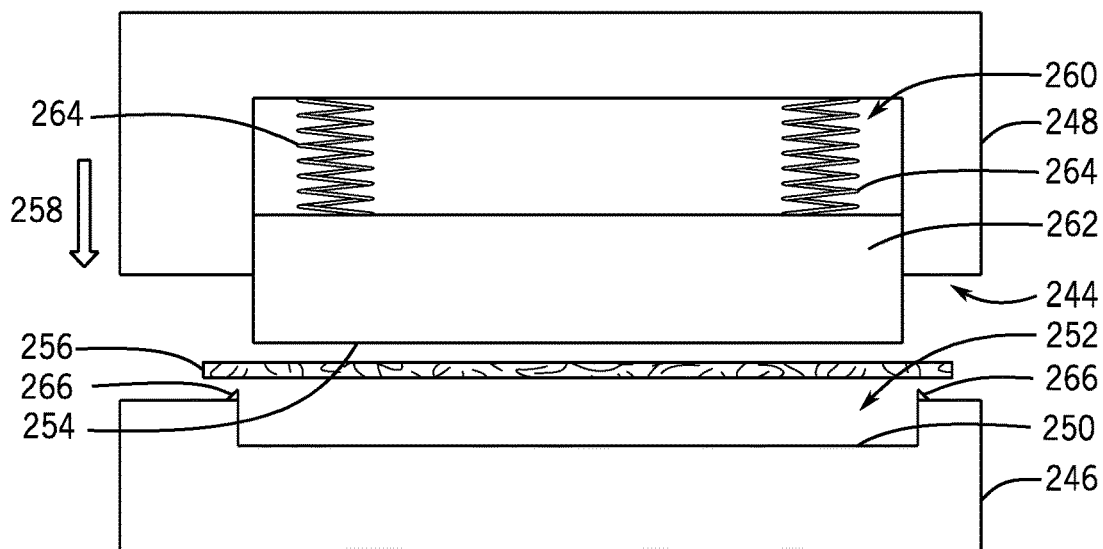
FIG. 25 is a schematic diagram of an embodiment of a mold assembly having a floating core assembly configured to urge a fiber panel against a surface of a mold element.

FIG. 25 is a schematic diagram of an embodiment of a mold assembly 244 having a floating core assembly configured to urge a fiber panel against a surface of a mold element. According to an exemplary embodiment, mold assembly 244 may comprise a first (e.g., lower) mold element 246 and a second (e.g., upper) mold element 248. First mold element 246 may comprise a first surface 250 defining a first portion of a mold cavity 252, and second mold element 248 may comprise a second surface 254 defining a second portion of mold cavity 252. First surface 250 may be configured to receive a fiber panel 256, and second surface 254 may be configured to compress fiber panel 256 against first surface 250 to form fiber panel 256 into a desired shape.

According to an exemplary embodiment, second mold element 248 may comprise a floating core assembly 260 having a core 262 and biasing members 264 (e.g., springs). Second surface 254 of second mold element 248 is formed by core 262 of floating core assembly 260. Prior to compressing fiber panel 256 within mold cavity 252, core 262 urges the fiber panel against first surface 250 of first mold element 246 as second mold element 248 moves in direction 258. Once second surface 254 is in contact with fiber panel 256, and fiber panel 256 is in contact with first surface 250, further movement of second mold element 248 in direction 258 induces the core to transition from the illustrated extended position to a retracted position. With core 262 in the retracted position, biasing members 264 provide sufficient force to compress fiber panel 256 within mold cavity 252.

According to an exemplary embodiment, fiber panel 256 may comprise a combination of structural fibers and thermoplastic resin. The structural fibers may comprise natural fibers, such as hemp, wood, flax, kenaf and sisal, and/or synthetic fibers, such as glass fibers, carbon fibers and polymeric fibers. The thermoplastic resin may comprise polypropylene (PP), acrylonitrile butadiene styrene (ABS) and/or polycarbonate (PC) binders. Fiber panel 256 may be constructed from about 50 percent natural fibers and about 50 percent PP. To facilitate compression forming, fiber panel 256 is heated (e.g., to about 200 degrees Celsius) to induce the thermoplastic resin to liquefy. Fiber panel 256 is urged against first surface 250 of cavity 252 and compressed between first surface 250 and second surface 254 as second mold element 248 is driven toward first mold element 246 along direction 258. As fiber panel 256 cools within mold assembly 244, the thermoplastic solidifies, thereby establishing a substantially rigid composite panel that conforms to the shape of mold cavity 252.

According to an exemplary embodiment, fiber panel 256 may comprise a combination of structural fibers and a thermoset resin. The structural fibers may comprise natural fibers, such as hemp, wood, flax, kenaf and sisal, and/or synthetic fibers, such as glass fibers, carbon fibers and polymeric fibers. The thermoset resin may comprise epoxy resin, polyimide resin, polyester resin and/or vinylester resin. Fiber panel 256 may be constructed from Fibrowood, which is manufactured by Johnson Controls Technology Company of Holland, Mich. To facilitate compression forming, fiber panel 256 is urged against first surface 250 of cavity 252 and compressed between first surface 250 and second surface 254 as second mold element 248 is driven toward first mold element 246 along direction 258. During the compression process, panel 256 is heated (e.g., via a heated mold assembly 244), inducing the thermoset resin to cure. A substantially rigid composite panel that conforms to the shape of mold cavity 252 is formed.

According to an exemplary embodiment, first mold element 246 may comprise trim blades 266 configured to trim fiber panel 256 to desired dimensions as fiber panel 256 is compressed within mold cavity 252. Movement of second mold element 248 in direction 258 induces core 262 to retract upon contact between core 262, fiber panel 256 and first surface 250. As core 262 retracts, a body of second mold element 248 continues to move in direction 258. Contact between the body of second mold element 248 and fiber panel 256 drives edges of fiber panel 256 into contact with trim blades 266. Further movement of second mold element 248 in direction 258 induces trim blades 266 to penetrate fiber panel 256, trimming fiber panel 256 to the desired dimensions. While two trim blades 266 are employed in the illustrated embodiment, alternative embodiments may comprise more or fewer trim blades 266 (e.g., one, two, three, four, five, six or more). While trim blades 266 are coupled to first mold element 246 in the illustrated embodiment, at least a portion of trim blades 266 may be coupled to second mold element 248 in alternative embodiments. Because the fiber panel is disposed against first surface 250 of first mold element 246 before trim blades 266 penetrate fiber panel 256, the possibility of the fiber panel being caught on trim blades 266 is substantially reduced or eliminated. Fiber panel 256 may remain substantially smooth and properly oriented/positioned during the forming process, establishing a strong and/or aesthetically pleasing trim component.

Figure 26:
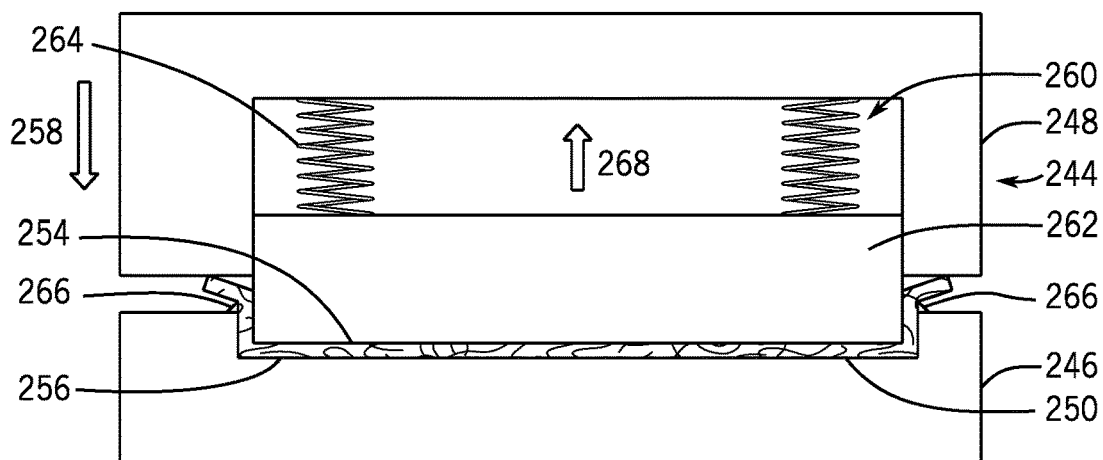
FIG. 26 is a schematic diagram of the mold assembly of FIG. 25, in which a core of the floating core assembly is in an extended position, and the fiber panel is disposed against the surface of the mold element.

FIG. 26 is a schematic diagram of mold assembly 244 of FIG. 25, in which core 262 of floating core assembly 260 is in an extended position, and fiber panel 256 is disposed against first surface 250 of first mold element 246. According to an exemplary embodiment, movement of second mold element 248 in direction 258 drives core 262 to urge fiber panel 256 against first surface 250 of first mold element 246. Once second surface 254 is in contact with fiber panel 256, and fiber panel 256 is in contact with first surface 250, further movement of second mold element 248 in direction 258 induces core 262 to move in direction 268 toward the retracted position. As core 262 retracts, biasing members 264 are compressed, increasing the force applied to core 262. According to an exemplary embodiment, the force applied by compressed biasing members 264 is sufficient to compress fiber panel 256 into a desired shaped within mold cavity 252. As the body of the second mold element is driven in direction 258, contact between the body and fiber panel 256 drives edges of fiber panel 256 into contact with trim blades 266. Further movement of second mold element 248 in direction 258 induces trim blades 266 to penetrate fiber panel 256, trimming fiber panel 256 to the desired dimensions.

Figure 27:
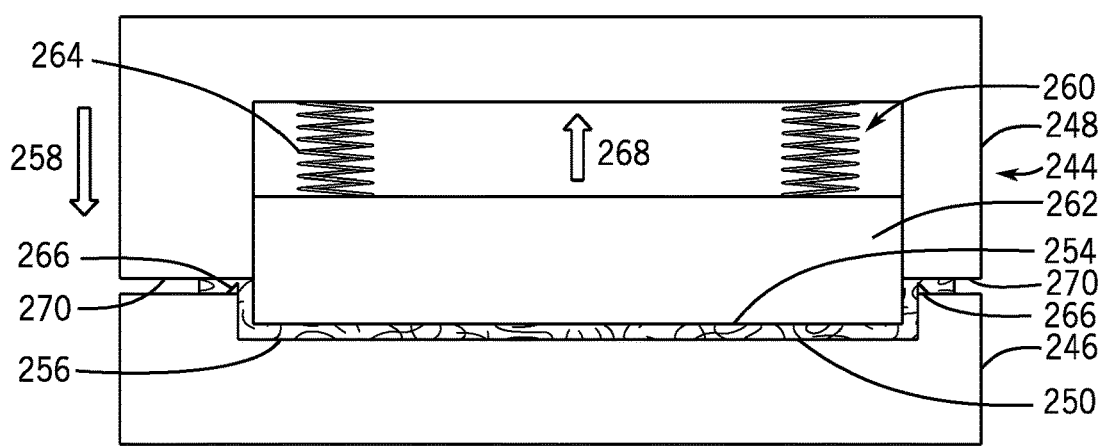
FIG. 27 is a schematic diagram of the mold assembly of FIG. 25, in which the core of the floating core assembly is in a retracted position.

FIG. 27 is a schematic diagram of mold assembly 244 of FIG. 25, in which core 262 of floating core assembly 260 is in a retracted position. According to an exemplary embodiment, with core 262 in the retracted position, compressed biasing members 264 urge core 262 toward first surface 250 of first mold element 246 with sufficient force to compress fiber panel 256 into a desired shape. A bearing surface 270 of second mold element 248 may drive fiber panel 256 toward first mold element 246 such that trim blades 266 penetrate fiber panel 256 and trim fiber panel 256 to the desired dimensions. Because the fiber panel is disposed against first surface 250 of first mold element 246 before trim blades 266 penetrate fiber panel 256, the possibility of the fiber panel being caught on trim blades 266 is substantially reduced or eliminated. Fiber panel 256 may remain substantially smooth and properly oriented/positioned during the forming process, establishing a strong and/or aesthetically pleasing trim component.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. In an effort to provide a concise description of the exemplary embodiments, all features of an actual implementation may not have been described (i.e., those unrelated to the presently contemplated best mode of carrying out the invention, or those unrelated to enabling the claimed invention). In the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A trim component for a vehicle interior comprising:
a fiber panel; and
a structure comprising a resin;
wherein the fiber panel comprises a compression-formed component;
wherein the compression-formed component comprises an edge along a periphery and provides a structural substrate having a shape and a thickness along the edge;
wherein the structure comprises a border of the structural substrate along the thickness of the structural substrate provided by the compression-formed component.

2. The trim component of claim 1 wherein the fiber panel comprises a plurality of fibers and a resin configured to bind the fibers; and wherein the structure comprises a molded resin.

3. The trim component of claim 1 wherein the periphery of the compression-formed component comprises an edge; wherein the structure is formed on the edge.

4. The trim component of claim 1 wherein the structure is configured to accommodate at least one variation in at least one edge of the fiber panel.

5. The trim component of claim 1 wherein the structure comprises a rib configured to reinforce the fiber panel.

6. The trim component of claim 1 wherein the structure comprises a molded feature configured to support the fiber panel.

7. The trim component of claim 1 further comprising a cover for the structural substrate.

8. The trim component of claim 7 wherein the cover comprises at least one of (a) cover stock; (b) a woven fabric; (c) a non-woven fabric; (d) an applique; (e) a vinyl layer; (f) a foam layer; (g) a foil layer; (h) a leather covering.

9. A trim component for a vehicle interior comprising:
a fiber panel comprising a compression-formed component; and
a structure formed from a molded resin;
wherein the structure comprises at least one molded feature;
wherein the compression-formed component comprises an edge along a periphery and provides a structural substrate having a shape and a thickness along the edge;
wherein the structure comprises a border of the structural substrate along the thickness of the structural substrate provided by the compression-formed component; and
wherein the at least one molded feature comprises a molded feature configured to support the fiber panel.

10. The trim component of claim 9 wherein the molded feature configured to support the fiber panel comprises a rib.

11. The trim component of claim 10 wherein the rib comprises at least one of (a) a ridge; (b) a runner.

12. The trim component of claim 9 wherein the molded feature comprises the border coupled to at least a portion of a periphery of the fiber panel.

13. The trim component of claim 9 wherein the border of the structural substrate comprises a resin border about a periphery of the fiber panel.

14. The trim component of claim 9 further comprising a cover for the compression-formed component.

15. A trim component for a vehicle interior comprising:
a structural substrate comprising a compression-formed fiber panel and a structure comprising a resin;
wherein the compression-formed fiber panel comprises a thickness along a periphery;
wherein the structure comprises a border of the structural substrate along the thickness of the periphery of the compression-formed fiber panel;
wherein the periphery of the fiber panel comprises an edge;
wherein the structure is formed on the edge.

16. The trim component of claim 15 wherein the fiber panel comprises a plurality of fibers and a resin configured to bind the fibers; and wherein the structure comprises a molded resin.

17. The trim component of claim 15 wherein the structure is bonded to the compression-formed fiber panel.

18. The trim component of claim 15 wherein the structure comprises an injection-molded resin configured to reinforce the compression-formed fiber panel.

19. The trim component of claim 15 wherein the structure comprises a molded feature providing an ancillary component.

20. The trim component of claim 15 wherein the border comprises a dimensionally accurate border.

* * * * *